United States Patent
Trimble et al.

(10) Patent No.: US 9,678,973 B2
(45) Date of Patent: Jun. 13, 2017

(54) MULTI-NODE HYBRID DEDUPLICATION

(71) Applicant: HITACHI DATA SYSTEMS CORPORATION, Santa Clara, CA (US)

(72) Inventors: Ronald Ray Trimble, Acton, MA (US); Jeffrey V. Tofano, San Jose, CA (US); Thomas R. Ramsdell, San Jose, CA (US); Jon Christopher Kennedy, Marlborough, MA (US)

(73) Assignee: HITACHI DATA SYSTEMS CORPORATION, Santa Clara, CA (US)

( * ) Notice: Subject to any disclaimer, the term of this patent is extended or adjusted under 35 U.S.C. 154(b) by 186 days.

(21) Appl. No.: 14/515,020

(22) Filed: Oct. 15, 2014

(65) Prior Publication Data

US 2015/0106345 A1  Apr. 16, 2015

Related U.S. Application Data

(60) Provisional application No. 61/891,042, filed on Oct. 15, 2013.

(51) Int. Cl.
*G06F 17/30* (2006.01)

(52) U.S. Cl.
CPC ............................... *G06F 17/30156* (2013.01)

(58) Field of Classification Search
CPC ... G06F 17/30156; G06F 3/067; G06F 3/0641
See application file for complete search history.

(56) References Cited

U.S. PATENT DOCUMENTS

| 5,276,860 A | 1/1994 | Fortier et al. |
| 5,403,639 A | 4/1995 | Belsan et al. |
| 5,990,810 A | 11/1999 | Williams |
| 6,101,472 A | 8/2000 | Giangarra et al. |

(Continued)

FOREIGN PATENT DOCUMENTS

| EP | 0774715 A1 | 5/1997 |
| KR | 1020060073724 | 6/2006 |

(Continued)

OTHER PUBLICATIONS

Wei Dong, Fred Douglis, Kai Li, and Hugo Patterson, "Tradeoffs in Scalable Data Routing for Deduplication Clusters", USENIX Association, FAST '11: 9th USENIX Conference on File and Storage Technologies, Feb. 2011, pp. 15-29.*

(Continued)

*Primary Examiner* — Cheryl Lewis
(74) *Attorney, Agent, or Firm* — Mattingly & Malur, PC

(57) ABSTRACT

According to at least one embodiment, a data storage system is provided. The data storage system includes memory, at least one processor in data communication with the memory, and a deduplication director component executable by the at least one processor. The deduplication director component is configured to receive data for storage on the data storage system, analyze the data to determine whether the data is suitable for at least one of summary-based deduplication, content-based deduplication, and no deduplication, and store, in a common object store, at least one of the data and a reference to duplicate data stored in the common object store.

26 Claims, 13 Drawing Sheets

(56) References Cited

U.S. PATENT DOCUMENTS

| | | |
|---|---|---|
| 6,366,986 B1 | 4/2002 | St. Pierre et al. |
| 6,385,706 B1 | 5/2002 | Ofek et al. |
| 6,477,544 B1 | 11/2002 | Bolosky et al. |
| 6,542,906 B2 | 4/2003 | Korn |
| 6,704,730 B2 | 3/2004 | Moulton et al. |
| 6,714,952 B2 | 3/2004 | Dunham et al. |
| 6,779,095 B2 | 8/2004 | Selkirk et al. |
| 6,795,819 B2 | 9/2004 | Wheeler et al. |
| 6,889,297 B2 | 5/2005 | Krapp et al. |
| 7,024,427 B2 | 4/2006 | Bobbitt et al. |
| 7,043,727 B2 | 5/2006 | Bennett et al. |
| 7,055,008 B2 | 5/2006 | Niles et al. |
| 7,065,619 B1 | 6/2006 | Zhu et al. |
| 7,116,249 B2 | 10/2006 | McCanne et al. |
| 7,146,476 B2 | 12/2006 | Sandorfi et al. |
| 7,155,585 B2 | 12/2006 | Lam et al. |
| 7,181,373 B2 | 2/2007 | Le Cocq et al. |
| 7,251,680 B2 | 7/2007 | DeVos |
| 7,373,603 B1 | 5/2008 | Yalovsky et al. |
| 7,430,647 B2 | 9/2008 | Sandorfi et al. |
| 7,457,934 B2 | 11/2008 | Yagawa |
| 7,472,242 B1 | 12/2008 | Deshmukh et al. |
| 7,552,358 B1 | 6/2009 | Asgar-Deen et al. |
| 7,555,755 B2 | 6/2009 | Fairweather |
| 7,590,808 B2 | 9/2009 | Lam et al. |
| 7,822,725 B2 | 10/2010 | Walliser et al. |
| 7,885,972 B2 | 2/2011 | Pragada et al. |
| 7,941,440 B2 | 5/2011 | Pragada |
| 7,962,499 B2 | 6/2011 | Lam |
| 8,078,634 B2 | 12/2011 | Pragada et al. |
| 8,121,993 B2 | 2/2012 | Blount et al. |
| 8,140,821 B1 | 3/2012 | Raizen et al. |
| 8,156,306 B1 | 4/2012 | Raizen et al. |
| 8,214,392 B2 | 7/2012 | Pragada et al. |
| 8,280,926 B2 | 10/2012 | Sandorfi et al. |
| 8,285,690 B2 | 10/2012 | Nakamura et al. |
| 2002/0059505 A1 | 5/2002 | St. Pierre et al. |
| 2002/0091710 A1 | 7/2002 | Dunham et al. |
| 2003/0014462 A1 | 1/2003 | Bennett et al. |
| 2003/0074378 A1 | 4/2003 | Midgley et al. |
| 2003/0105912 A1 | 6/2003 | Noren |
| 2003/0145248 A1 | 7/2003 | McNeil |
| 2003/0158831 A1 | 8/2003 | Zaremba |
| 2003/0177149 A1 | 9/2003 | Coombs |
| 2005/0108486 A1 | 5/2005 | Sandorfi |
| 2005/0193235 A1 | 9/2005 | Sandorfi et al. |
| 2006/0059207 A1 | 3/2006 | Hirsch et al. |
| 2007/0050423 A1 | 3/2007 | Whalen et al. |
| 2007/0101074 A1 | 5/2007 | Patterson |
| 2007/0255758 A1 | 11/2007 | Zheng et al. |
| 2008/0016131 A1 | 1/2008 | Sandorfi et al. |
| 2008/0028007 A1 | 1/2008 | Ishii et al. |
| 2008/0034017 A1 | 2/2008 | Giampaolo et al. |
| 2008/0082310 A1 | 4/2008 | Sandorfi et al. |
| 2008/0184001 A1 | 7/2008 | Stager |
| 2008/0243914 A1 | 10/2008 | Prahlad et al. |
| 2008/0275866 A1 | 11/2008 | Pragada et al. |
| 2008/0275911 A1 | 11/2008 | Sandorfi et al. |
| 2008/0294696 A1 | 11/2008 | Frandzel |
| 2008/0301134 A1 | 12/2008 | Miller et al. |
| 2009/0172326 A1 | 7/2009 | Sandorfi |
| 2009/0177661 A1 | 7/2009 | Sandorfi et al. |
| 2009/0193219 A1 | 7/2009 | Ohira et al. |
| 2009/0300321 A1 | 12/2009 | Balachandran et al. |
| 2009/0307251 A1 | 12/2009 | Heller et al. |
| 2010/0017487 A1 | 1/2010 | Patinkin |
| 2010/0088296 A1 | 4/2010 | Periyagaram et al. |
| 2010/0095158 A1 | 4/2010 | Shah-Hosseini |
| 2010/0188273 A1 | 7/2010 | He et al. |
| 2010/0198797 A1 | 8/2010 | Wideman |
| 2011/0016095 A1 | 1/2011 | Anglin et al. |
| 2011/0022989 A1 | 1/2011 | Lin et al. |
| 2011/0072017 A1 | 3/2011 | Pragada |
| 2011/0093501 A1 | 4/2011 | Pragada et al. |
| 2011/0099200 A1 | 4/2011 | Blount et al. |
| 2011/0145253 A1 | 6/2011 | Pragada et al. |
| 2011/0145254 A1 | 6/2011 | Pragada et al. |
| 2011/0184921 A1 | 7/2011 | Reiter et al. |
| 2011/0184966 A1 | 7/2011 | Reiter et al. |
| 2011/0184967 A1 | 7/2011 | Reiter et al. |
| 2011/0185133 A1 | 7/2011 | Reiter et al. |
| 2011/0273982 A1 | 11/2011 | Akirav et al. |
| 2011/0307447 A1 | 12/2011 | Sabaa et al. |
| 2012/0089574 A1 | 4/2012 | Doerner |
| 2012/0150954 A1 | 6/2012 | Tofano |
| 2012/0166448 A1 | 6/2012 | Li et al. |
| 2012/0191669 A1 | 7/2012 | Kennedy et al. |
| 2012/0191670 A1 | 7/2012 | Kennedy et al. |
| 2013/0120379 A1 | 5/2013 | Adair et al. |
| 2014/0189071 A1* | 7/2014 | Leighton ............ H04L 67/2847 709/219 |
| 2014/0344229 A1* | 11/2014 | Lillibridge ............ G06F 3/0608 707/692 |

FOREIGN PATENT DOCUMENTS

| | | |
|---|---|---|
| WO | 2005017686 A2 | 2/2005 |
| WO | 2005033945 A1 | 4/2005 |

OTHER PUBLICATIONS

W. Litwin, D. D. E. Long, and Thomas Schwarz, "Combining Chunk Boundary and Chunk Signature Calculations for Deduplication", IEEE Latin America Transactions, vol. 10, No. 1, Jan. 2012, pp. 1305-1311.*

Deepavali Ghagwat, Kaye Eshghi, Darrell D. E. Long, and Mark Lillibridge, "Extreme Binning: Scalable, Parallel Deduplication for Chunk-based File Backup", Proceedings of the 17th IEEE/ACM International Symposium on Modeling, Analysis and Simulation of Computer and Telecommunication Systems, (MASCOTS' 2009) London, UK, Sep. 21-23, 2009, pp. 1-9.*

Benjamin Zhu, Kai Li, and Hugo Patterson, "Avoiding the Disk Bottneck in the Data Domain Deduplication File System", FAST 08' 6th USENIX Conference on File and Storage Technologies, San Jose, California, Feb. 26-29, 2008, pp. 269-282.*

Bhagwat et al. "Extreme Binning: Scalable, Parallel Deduplication for Chunk-based File Backup". originally published in the Proceedings of the 17th IEEE/ACM International Symposium on Modelling, Analysis and Simulation of Computer and Telecommunication Systems, (MASCOTS' 2009) London, UK, Sep. 21-23, 2009.

Meiri et al. "Parallel Compression of Correlated Files". 2007 IEEE International Conference on Cluster Computing. pp. 285-292. Sep. 2007.

Zhu et al. "Avoiding the Disk Bottleneck in the Data Domain Deduplication File System". FAST '08 6th USENIX Conference on File and Storage Technologies. San Jose, CA, Feb. 26-29, 2008.

* cited by examiner

MULTI-NODE HYBRID DEDUPLICATION

RELATED APPLICATIONS

The present application claims priority under 35 U.S.C. §119(e) to U.S. Provisional Application 61/891,042, titled "MULTI-NODE HYBRID DEDUPLICATION," filed on Oct. 15, 2013, which is hereby incorporated herein by reference in its entirety.

BACKGROUND

Technical Field

Aspects of the present disclosure relate to data storage, and more particularly, to apparatus and methods for storing and deduplicating large amounts data.

Discussion

Systems tasked with storing and accessing large amounts of data face significant challenges due to the volume of information these systems must process. These "big data" challenges include providing adequate processing performance (e.g., speed and throughput) while judiciously consuming data storage space. Data storage and protection systems constitute one class of systems that face these challenges. For example, it is preferable that data storage and protection systems maintain high enough data throughput to ingest and store terabytes, pedabytes, or even more data within restricted time windows while consuming as little data storage space as possible.

Data protection and deduplication technologies have conventionally been grouped into well-defined categories. For example, deduplication methodologies are typically categorized as either inline or post-process. Inline methodologies attempt to identify duplicate data as a backup data stream is introduced to a system and before that data is written to backend data storage. Post-process methodologies allow data to be stored and subsequently identify duplicate data within the previously stored data. Similar groupings exist with respect to data protection platform architectures, which are conventionally categorized as either single node or multi-node.

Historically, there has also been a coupling between respective data protection platform architectures and corresponding deduplication methodologies. More specifically single node architectures have employed inline hash-based algorithms of one form or another, whereas multi-node architectures have relied on byte differential deduplication. There are advantages and disadvantages to each of these designs as well as technical reasons behind the canonical pairing of deduplication methodology with data protection architecture.

SUMMARY OF INVENTION

The technology described herein facilitates the uncoupling of conventional pairings between deduplication methodology and data protection architecture by creating a scalable, multi-node data protection platform that utilizes both summary-based (e.g., hash-based) and content-based (e.g., byte differential-based) deduplication methodologies. Each of these deduplication methodologies may be executed inline or post-process. By being implemented with this design, embodiments disclosed herein are able to provide users with advantages of a scalable architecture while employing deduplication methodologies that are well suited for data being received.

Further, some embodiments disclosed herein manifest an appreciation that employing both summary-based and content-based deduplication in a scalable, multi-node platform requires a repository which is able to transparently process and store data of varying data types, sizes, and backup formats (e.g., full backups, incremental backups, file backups). Further, various embodiments disclosed herein manifest an appreciation that the data may include dissimilar deduplication properties when processed by the data repository. Within these embodiments, a common data format for efficiently storing data as data objects in a single globally coherent repository is disclosed.

Other embodiments manifest an appreciation that many data objects (e.g. files) are relatively small (e.g., average file size is approximately 100 KB and many files are 4 KB or less) and that these data objects are often associated into small groups (e.g., an average directory holds approximately 6 files). In these embodiments, efficiencies are realized by a common object store component that stores objects of variable sizes within well defined extents. Objects (e.g., files) larger than an extent are decomposed and stored in multiple extents. Further, in these embodiments, the extents are packed with objects in a first in, first written manner, and the extents are organized to promote efficient writing to storage and reading from storage.

Some embodiments include a data storage system that efficiently stores both small files and large files in a space-efficient manner. In these embodiments, the data storage system realizes efficiencies by exposing an interface that supports conventional file system access. However, the data storage system's common data format supports small variable-size objects which may be efficiently stored, identified for deduplication, and retrieved. Within these embodiments are disclosed methods for deduplication, including deduplication processes that perform space compaction and reclamation.

According to at least one embodiment, a data storage system is provided. The data storage system includes memory, at least one processor in data communication with the memory, and a deduplication director component executable by the at least one processor. The deduplication director component is configured to receive data for storage on the data storage system, analyze the data to determine whether the data is suitable for at least one of summary-based deduplication, content-based deduplication, and no deduplication, and store, in a common object store, at least one of the data and a reference to duplicate data stored in the common object store.

In the data storage system, the deduplication director component may be configured to store, in the common object store, the data in response to determining that the data is suitable for no deduplication. The deduplication director component may be configured to store, in the common object store, the reference to the duplicate data at least in part by executing a summary-based deduplication component in response to determining that the data is suitable for summary-based deduplication. The summary-based deduplication component may be configured to generate a summary of the data, identify the data as being a copy of the duplicate data at least in part by comparing the summary to a duplicate summary of the duplicate data, and store, in the common object store, the reference to the duplicate data in response to identifying the data as being a copy of the duplicate data.

In the data storage system, the deduplication director component may be configured to store, in the common object store, the reference to the duplicate data at least in part by executing a content-based deduplication component in response to determining that the data is suitable for content-based deduplication. The content-based deduplication component being configured to identify the data as being a copy of the duplicate data by comparing the data to the duplicate data and store, in the common object store, the reference to the duplicate data in response to identifying the data as being a copy of the duplicate data.

In the data storage system, the deduplication director component may be configured to analyze the data at least in part by identifying at least one deduplication template to apply to the data, the at least one deduplication template specifying one or more deduplication options for the data. The at least one deduplication template may specify that at least one of a summary-based deduplication component and a content-based deduplication component process the data.

The data storage system may further include a content-based deduplication component and a summary-based deduplication component. In the data storage system, the common object store may store a map that associates the data with one or more objects stored in the common object store and at least one of the content-based deduplication component and the summary-based deduplication component may be configured to deduplicate the map.

The data storage system may further include a file system interface component configured to receive one or more files for storage on the data storage system and a common object store component executable by the at least one processor and configured to store each of the one or more files as one or more data objects structured differently from the one or more files. In the data storage system, the file system interface component may include a proxy file system interface configured to receive source level deduplication information. The proxy file system interface may be further configured to determine whether subject data identified within the source level deduplication information is stored in the data storage system.

According to another embodiment, a method of deduplicating data using a data storage system is provided. The method includes acts of receiving, by the data storage system, data for storage on the data storage system, analyzing the data to determine whether the data is suitable for at least one of summary-based deduplication, content-based deduplication, and no deduplication, and storing, in a common object store, at least one of the data and a reference to duplicate data stored in the common object store.

In the method, the act of analyzing the data may include an act of identifying at least one deduplication template to apply to the data, the at least one deduplication template specifying one or more deduplication options for the data. The act of identifying the at least one deduplication template may include an act of identifying at least one deduplication template that specifies at least one of a summary-based deduplication component and a content-based deduplication component process the data.

In the method, the common object store may store a map that associates the data with one or more objects stored in the common object store and the method further include an act of deduplicating the map. The act of deduplicating the map may include an act of re-segmenting at least one data object associated with the map.

The method may further include acts of receiving one or more files for storage on the data storage system and storing each of the one or more files as one or more data objects structured differently from the one or more files. The method may further include an act of receiving source level deduplication information. The method may further include an act of determining whether subject data identified within the source level deduplication information is stored in the data storage system.

According to another embodiment, a non-transitory computer readable medium is provided. The computer readable medium stores computer executable instructions configured to instruct at least one processor to execute a hybrid deduplication process. The computer executable instructions including instructions to receive data for storage on the data storage system, analyze the data to determine whether the data is suitable for at least one of summary-based deduplication, content-based deduplication, and no deduplication, and store, in a common object store, at least one of the data and a reference to duplicate data stored in the common object store.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Any embodiment or example disclosed herein may be combined with any other embodiment or example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the invention. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
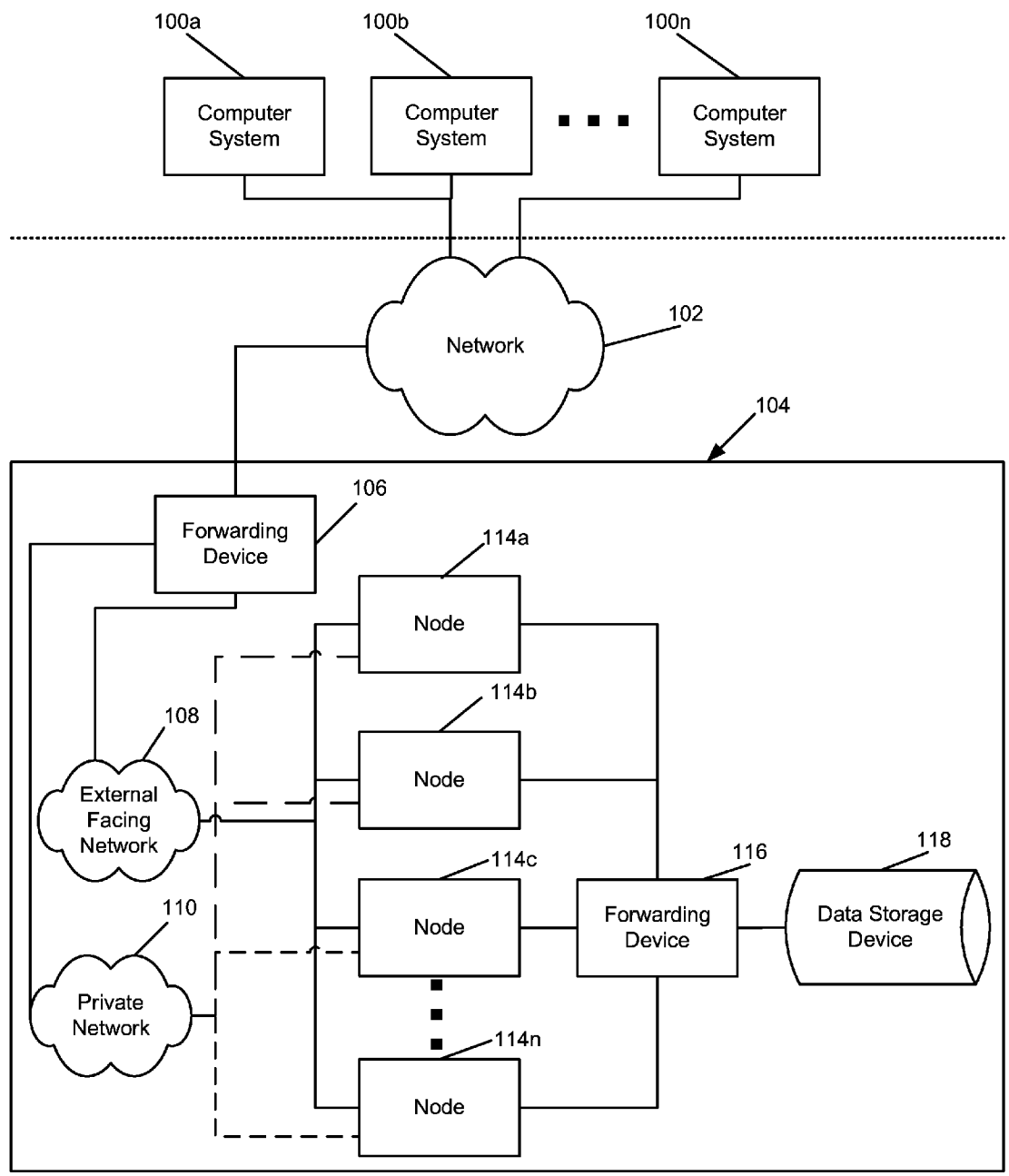
FIG. 1 is a block diagram of a data storage system in accordance with an embodiment.

At least some embodiments disclosed herein implement a scalable multi-node hybrid deduplication system. In these embodiments, the hybrid deduplication system is configured to receive and deduplicate data. For instance, in at least one embodiment, the hybrid deduplication system receives data from one or more external computer systems via one or more standardized interfaces. The hybrid deduplication system determines whether the received data is targeted for deduplication processing and, if so, determines the type of deduplication processing to apply to the received data. For example, the hybrid deduplication system may apply (e.g., inline or post-process) summary-based deduplication, content-based deduplication, or both. The hybrid deduplication system persistently stores the received and deduplicated data within a common object store configured to support efficient, scalable, and distributed parallel processing of the received data in future. This processing may include further deduplication processes or other application level processes.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Data Storage System

Various embodiments disclosed herein include a data storage system configured to receive and store data from one or more computer systems and subsequently retrieve and provide the data to one or more computer systems. The architecture of the data storage system may include one or more nodes. FIG. 1 illustrates one embodiment of a data storage system 104 that is a computer system specially configured to perform various data storage processes in accordance with aspects and embodiments disclosed herein. In this embodiment, the data storage system 104 is coupled to, and exchanges data with, computer systems 100a-100n via the network 102. Computer systems 100a through 100n may include a variety of computing devices such as servers, workstations, laptops, smart phones, tablets, and any other computing device capable of generating data requiring backup storage, long term remote storage, or any other sort of data storage.

According to an embodiment illustrated in FIG. 1, the data storage system 104 includes two forwarding devices 106 and 116, a storage support network 108, a private network 110, nodes 114a-114n, and a data storage device 118. The storage support network 108 provides for external administrative access to each of the nodes within the data storage system 104 via a management computer system, such as may be implemented using any of the computer systems 100a through 100n or other computer systems configured in accordance with embodiments disclosed herein. The forwarding device 106 couples the storage support network 108 to the network 102, thereby providing for data communication between the computer systems 100a-100n and the data storage system 104. In various embodiments, the forwarding device 106 includes a switch, such as Ethernet switch, or set of switches. These switches may be Ethernet switches capable of 1 Gb/s, 10 Gb/s, 40 Gb/s, 100 Gb/s, or greater data rates.

In one embodiment illustrated in FIG. 1, the nodes 114a-114n are coupled to, and exchange data with, one another through the private network 110. In some embodiments, one or more of the nodes 114a-114n is configured to provide one or more services which provide data access to the data storage system 104. In these embodiments, these services may include namespace management, process management, extent allocation management, lock management, replication/data movement session management, and load balancing.

According to at least one embodiment, the private network 110 includes a standard Ethernet network. In other embodiments, the private network may be any high speed network such as an Infiniband, fiber channel, or other traditional or remote directory memory access (RDMA) based networks. The private network 110 provides for a communication channel between nodes that is unencumbered by potential storage support network traffic, allowing for more efficient communication between the nodes. As shown in FIG. 1, each of the nodes 114a-114n is also coupled to the forwarding device 116, which may include a fiber channel switch. The forwarding device 116 is, in turn, coupled to a data storage device 118. The data storage device 118 may be comprised of storage arrays such as network attached storage (NAS) systems, storage area network (SAN) systems, or storage virtualization systems. Although the forwarding device 116 and the data storage service 118 are illustrated within the data storage system 104, in other embodiments the forwarding device 116 and the data storage device 118 may be external to the data storage system 104.

The data storage system 104 may be scaled to increase or decrease nodes as required for a particular operational environment. For example, in some implementations, the performance of the system can scale in substantially a linear fashion as nodes are added to the system. The amount of storage included within the storage array can also be scaled as required. In some implementations the storage array can be scaled to multiple pedabytes or more of data storage space.

In at least one embodiment, each computer system illustrated in FIG. 1 (e.g., each of computer systems 100a-100n and nodes 114a-114n) includes a processor and a memory coupled to the processor. In one embodiment, the memory includes volatile memory, such as RAM, and non-volatile memory, such as flash or spinning media. Other embodiments include computer systems with a variety of components, some of which are discussed further below with regard to FIG. 3. It is to be appreciated that computer systems 100a-100n and nodes 114a-114n may include any number of distinct computer systems, and embodiments disclosed herein are not limited to a particular number of computer systems or hardware makeup. In addition, for increased fault tolerance, each of the nodes 114a-114n may include redundant network connections to each of the networks to which the nodes are coupled.

In some embodiments, the multi-node architecture of the data storage system 104 provides for fault tolerance and node fail over. In these embodiments, should any one of nodes 114a-114n fail, one or more of the nodes 114a-114n may be configured to detect the failure and automatically perform the processes previously executed by the failed node until a suitable replacement is deployed and operational. Also, at least some of the components disclosed herein may continue to function seamlessly despite the failure of a particular node.

Embodiments of the data storage system 104 are not limited to the particular configuration illustrated in FIG. 1. This configuration is included for the purposes of illustration only. It is to be appreciated that various examples and embodiments utilize a variety of hardware components, software components, and combinations of hardware and software components that are configured to perform the processes and functions described herein. In addition, in some embodiments, the hardware components described above may be virtualized. Thus the scope of the embodiments disclosed herein is not limited to a particular set of hardware, software, or a combination thereof.

Figure 2:
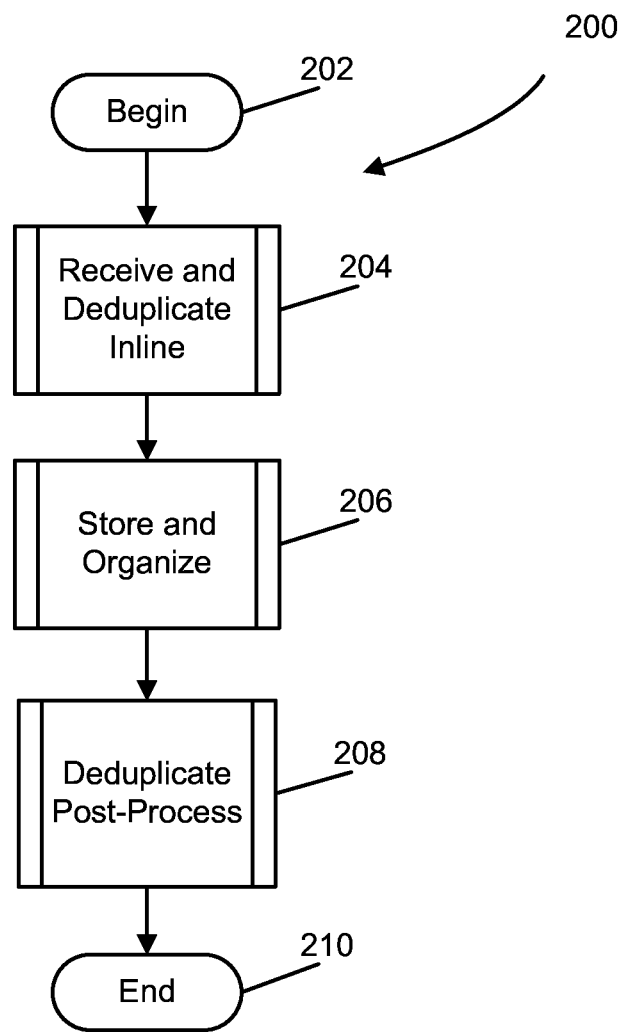
FIG. 2 is a flow diagram of a hybrid deduplication process in accordance with an embodiment.

In one embodiment illustrated by FIG. 1, each of the nodes 114a-114n includes components, e.g. executable code and data structures, configured to cause the data storage system 104 to perform data storage and hybrid deduplication processes. Particular examples of some of these components are described further below with regard to FIG. 4. One example of a hybrid deduplication process as executed by these components is illustrated as a storage process 200 in FIG. 2. According to this example, the storage process 200 includes acts of receiving and deduplicating data inline, storing and organizing the data, and deduplicating the data post-process. The storage process 200 begins at 202.

In act 204, data is received and deduplicated inline. According to various embodiments, a computer system, such as the data storage system 104 described above with reference to FIG. 1, receives data to be stored via a forwarding device, such as the forwarding device 106 described above with reference to FIG. 1. The forwarding device 106 transmits the data received to one or more of the nodes 114a-114n according to any of a variety of load balancing schemes. The node or nodes receiving the data determine whether inline deduplication (e.g., summary-based deduplication) should be performed on the data. If so, the receiving node or nodes execute an inline deduplication process on the data. Examples of processes and acts executed within the act 204 are described further below with reference to FIGS. 7-9.

In act 206, data is organized and stored. As discussed further below with reference to FIG. 6, data may be segmented and organized into one or more data objects. These data objects may be stored in one or more extents. In various embodiments, extents are logical groupings of data objects stored within a flexible container format. According to some embodiments, the receiving node or nodes organize and pack the data (deduplicated and non-deduplicated) according to an extent packing process, such as the extent packing process discussed in FIGS. 10 and 11, and forward the packed extent to data storage. This extent packing process may include the creation of a chronological tracking structure within a portion of the extent. The portion may be contiguous or partitioned and may be positioned at or near the front of the extent, the end of the extent, the middle of the extent or elsewhere. In some embodiments, the chronological tracking structure is ordered according to the order in which data is received and stored. In at least one embodiment, the chronological tracking structure includes information identifying the location of portions of data stored within the extent. This information may be used for subsequent access. Examples of processes and acts executed within the act 206 are described further below with reference to FIGS. 10-12.

In act 208, the data is deduplicated via execution of a post-process deduplication process (e.g., a summary-based or content-based deduplication processes). Post-process deduplication may supplement inline deduplication or may be utilized as an alternative to inline deduplication, depending on the characteristics of the data. In various embodiments, within the act 208, the computer system determines whether the data is targeted for post-process deduplication and, if so, executes a post-process deduplication of the data. Examples of processes and acts executed within the act 208 are described further below with reference to FIG. 12. Next, the storage process 200 terminates at 210.

Data storage and deduplication activities in accord with the deduplication process 200 execute both inline and post-process deduplication to make efficient use of data storage locations by decreasing the amount of data that must be physically stored. In addition, data storage processes in accord with the storage process 200 ready data for subsequent retrieval. In one embodiment, retrieved data (e.g., files and directory structures) may be restored to computer systems as needed for system recovery or other purposes. In other embodiments, retrieved data may be used by nodes, such as the nodes 114a-114n of FIG. 1, during inline and post-process deduplication processes.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 3:
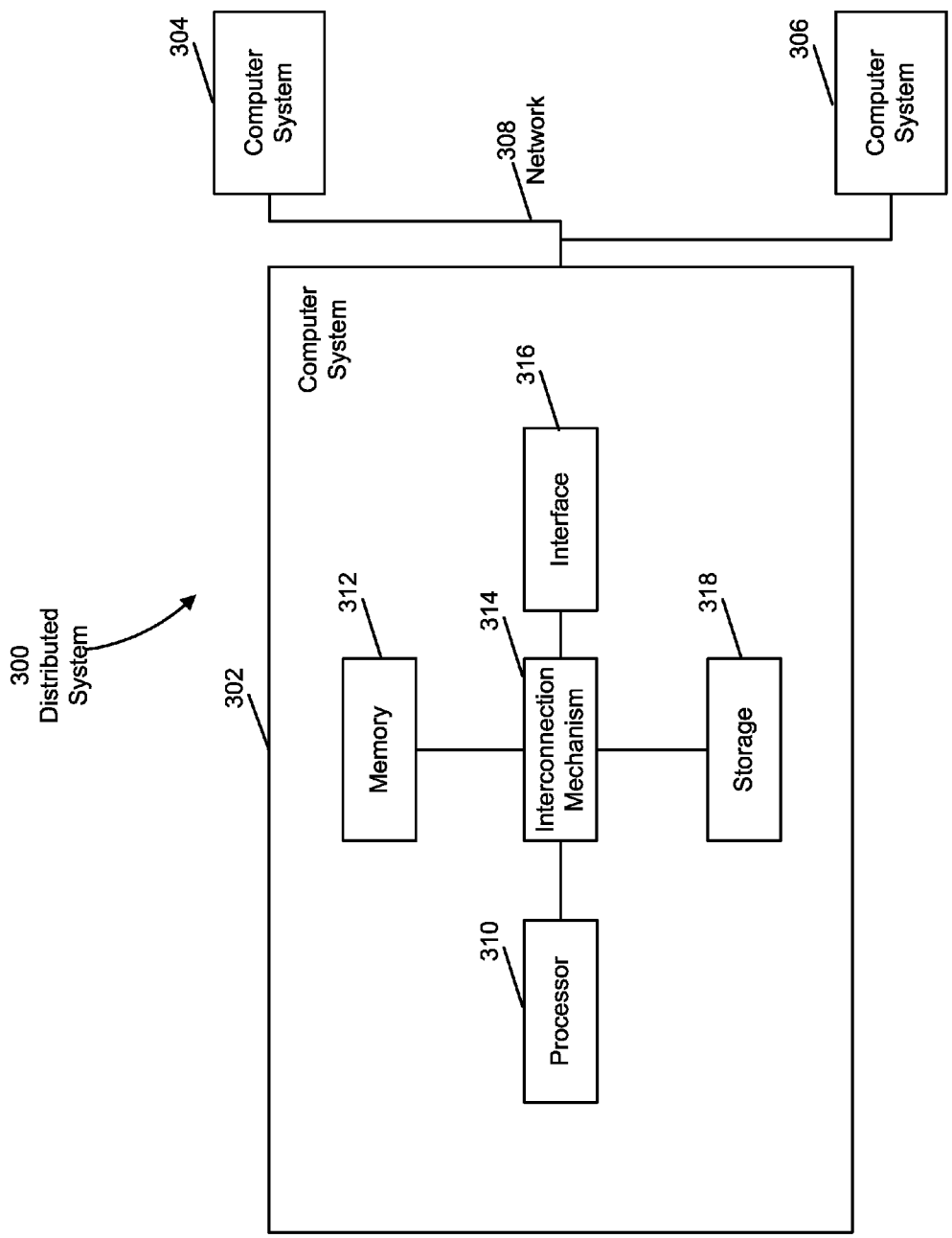
FIG. 3 is a block diagram of a computer system that may execute processes disclosed herein.

Referring to FIG. 3, there is illustrated a block diagram of a distributed computer system 300, in which various aspects and functions are practiced. As shown, the distributed computer system 300 includes one or more computer systems that exchange information. More specifically, the distributed computer system 300 includes computer systems 302, 304, and 306. As shown, the computer systems 302, 304, and 306 are interconnected by, and may exchange data through, a communication network 308. The network 308 may include any communication network through which computer systems may exchange data. To exchange data using the network 308, the computer systems 302, 304, and 306 and the network 308 may use various methods, protocols and standards. Examples of these protocols and standards include NAS, Web, storage and other data movement protocols suitable for use in a big data environment. To ensure data transfer is secure, the computer systems 302, 304, and 306 may transmit data via the network 308 using a variety of security measures including, for example, SSL or VPN technologies. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, an interconnection element 314, an interface 316 and data storage element 318. To implement at least some of the aspects, functions, and processes disclosed herein, the processor 310 performs a series of instructions that result in manipulated data. The processor 310 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 310 is connected to other system components, including one or more memory devices 312, by the interconnection element 314.

The memory 312 stores programs (e.g., sequences of instructions coded to be executable by the processor 310) and data during operation of the computer system 302. Thus, the memory 312 may be a relatively high performance, volatile, random access memory such as a dynamic random access memory ("DRAM") or static memory ("SRAM"). However, the memory 312 may include any device for storing data, such as a disk drive or other nonvolatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the interconnection element 314. The interconnection element 314 may include any communication coupling between system components such as one or more physical busses in conformance with specialized or standard computing bus technologies such as IDE, SCSI, PCI and InfiniBand. The interconnection element 314 enables communications, including instructions and data, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage element 318 includes a computer readable and writeable nonvolatile, or non-transitory, data storage medium in which instructions are stored that define a program or other object that is executed by the processor 310. The data storage element 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage element 318. The memory may be located in the data storage element 318 or in the memory 312, however, the processor 310 manipulates the data within the memory, and then copies the data to the storage medium associated with the data storage element 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed environments, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Node Software Architecture

Figure 4:
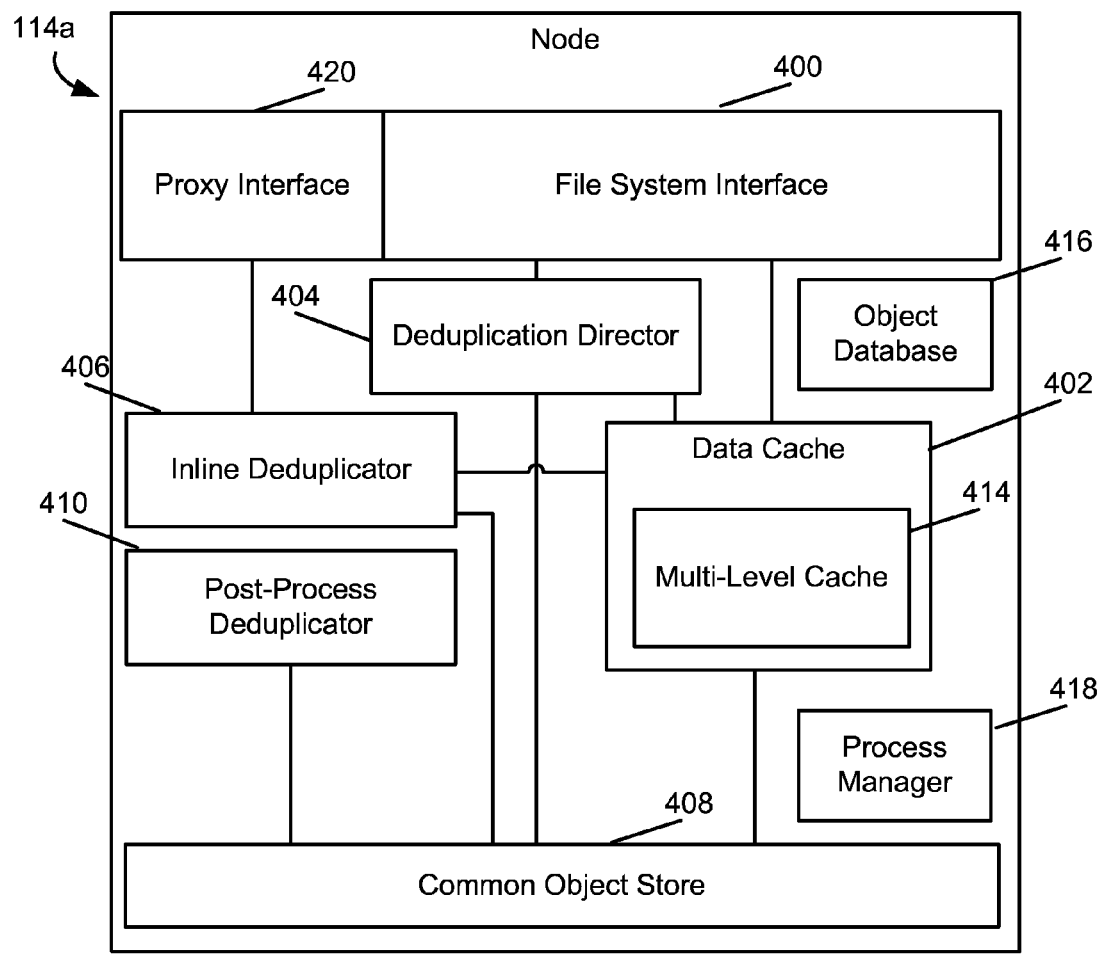
FIG. 4 is a block diagram of a node configured in accordance with an embodiment.

FIG. 4 presents, in block diagram form, physical and logical elements of a node, such as the node 114a described above with reference to FIG. 1. The node may be included in a data storage system, such as the data storage system 104 described above with reference to FIG. 1. As illustrated in FIG. 4, the node includes a file system interface 400, a data cache 402, a deduplication director 404, an inline deduplicator 406, a common object store 408, a post-process deduplicator 410, a common object database 416, and a process manager 418. In some embodiments illustrated by FIG. 4, the data cache 402 includes a multi-level cache 414, and the file system interface 400 includes a proxy interface 420.

Information may flow between these components and any components, elements or subsystems described herein, using any technique. Such techniques include, for example, passing the information over the network using standard protocols, such as RPC or TCP/IP; passing the information between modules in memory; and passing the information by writing to a file, database, or some other non-volatile storage device. In addition, pointers or other references to information may be processed, transmitted, or received in place of, or in addition to, copies of the information. For instance, processing within the data storage system 104 that involves transmission, reception, or manipulation of data within a cache (e.g., the data cache 402) may be performed without removing data from the cache. Instead, in some embodiments, pointers, references or any other information indicating the location or address of the data are transmitted, received, or processed in place of the data stored in the cache. Conversely, the information may be exchanged in place of, or in addition to, pointers or other references to the information. Other techniques and protocols for communicating information may be used without departing from the scope of this disclosure.

File System Interface

According to various embodiments, the file system interface 400 is configured to provide uniform and consistent access to the data storage system 104 while effectively hiding the details of data management processes being executed by the data storage system 104. In these embodiments, the file system interface 400 receives and processes data exchange requests. These data exchange requests may include information indicating that data subject to the request should be written, read, updated, or deleted. Data exchange requests may be received locally via standard file system calls (e.g., file open, write, etc). These local data exchange requests may be interpreted based on a kernel bridge. In addition, data exchange requests may be based on NAS protocols and various other standards and methods. For example, data exchange requests may be encoded according to CIFS, NFS, NDMP, VTL, REST APIs, POSIX, and HDFS or via proprietary high performance methods such as OST or purpose built data movers.

In response to receiving a data exchange request from a requesting process, the file system interface 400 is configured to identify the type of the request (e.g., whether the request is for data to be stored, retrieved, updated, or deleted) and to execute the request. In one embodiment, the file system interface 400 interacts with the data cache 402 to store data identified in the request. For example, if the request identifies data to be stored, the file system interface 400 stores the data in combination with metadata useful in deduplication processing (e.g., fingerprints or hash values) within the data cache 402 and responds with an acknowledgement. As used herein, the term "metadata" refers to data that represents information about the data and describes attributes of the data.

If the data exchange request indicates that data identified in the request is to be retrieved, the file system interface 400 first checks the data cache 402. If the data resides in the data cache 402, the file system interface 400 responds to the data exchange request with the data. If the file system interface 400 determines that the data is not stored in the data cache 402, the file system interface 400 accesses a list of data objects that constitute the data (as stored within an object store map, which is described further below) and requests the list of data objects from the common object store 408. In some embodiments, the inline deduplicator 406 acts as an intermediary between the file system interface 400 and the common object store 408 by receiving a request for the data from the file system interface 400, translating the request to object identifiers (OIDs), and requesting data objects identified by the OIDs from the common object store 408. Examples of OIDs include hash values or similar checksums or summaries calculated from data included in the object identified by the OID. In response to receiving information from the common object store 408 (in some embodiments, via the inline deduplicator 406) that indicates the location of the requested data objects within the data cache 402, the file system interface 400 identifies the data from the data objects and responds to the data exchange request by recomposing the data (e.g., a file) and providing the data to the requesting process.

If the data exchange request indicates that data identified in the request is to be deleted, the file system interface 400 first determines the location of the data within the data storage system. If the data is stored in the data cache 402, the file system interface 400 deletes the data and responds to the data exchange request with an acknowledgement. If the data is stored elsewhere, the file system interface 400 sends an object exchange request to delete the data to the common object store 408 and responds to the data exchange request with an acknowledgement.

If the request indicates that data subject to the request is to be updated, the file system interface 400 first checks the data cache 402. If the data resides in the data cache 402, the file system interface 400 updates the data in the data cache 402 and responds to the data exchange request with an acknowledgement. If the data is not stored the data cache 402, the file system interface 400 sends an object exchange request to retrieve the data to the common object store 408. In response to receiving the object exchange request, the common object store 408 retrieves the data from data storage, stores the data in the data cache 402 and responds to the object exchange request with an identifier of the data within the data cache 402. Next, the file system interface 400 updates the data in the data cache 402 and responds to the data exchange request with an acknowledgement. The file system interface 400 also sends an object exchange request to store the data to the common object store 408. Additional examples of processes that the file system interface 400 is configured to execute according to some embodiments are described further below with reference to FIG. 7.

It is appreciated that data loaded into the data cache 402 may continue to persist in the data cache 402 to speed up subsequent data exchange requests. Thus, the file system interface 400 may advantageously utilize the data cache 402 during servicing of data exchange requests. Likewise, it is appreciated that data loaded into the data cache 402 may also be used to increase the speed and efficiency of deduplication processes (e.g., by limiting unnecessary object exchange requests that may access persistent storage).

While as shown in FIG. 4, each process of the node 114a (e.g., the file system interface 400, the inline deduplicator 406, the object database 416, etc), is executed locally within the node 114a, in other embodiments, any process of the node 114a may be executed externally on one more computer systems (e.g., the nodes 114b-114n, or the computer systems 100a-100n external to the system 104 of FIG. 1).

Proxy Interface

As discussed above, services may execute on computer systems external to a node. For instance, a source file system interface may execute on the computer systems 100a-100n described above with reference to FIG. 1. In these embodiments, the source file system interface is configured to provide source level deduplication information to the proxy interface 420. The proxy interface 420 may execute as part of the file system interface 400 or may execute separately from the file system interface 400. The source level deduplication information may include information generated by data classification processes executed on the data identified in the request. The source level deduplication information may include, for example, an identifier of the data. This identifier may include, for example, an OID value, such as a hash value, calculated from the data. In some embodiments, the source file system interface executes in conjunction with locally configured protocol components (e.g., an OST object, a virtual file system driver, etc.).

In response to receiving a data exchange request, the proxy interface 420 is configured to determine whether the data is stored within the data storage system. In some embodiments, the proxy interface 420 determines whether the data is stored within the data storage system by issuing a request to the inline deduplicator 406 and receiving a response. If the response indicates that the data is stored within the common object store 408, the proxy interface 420 responds to the data exchange request with information indicating that the data need not be transmitted to the data storage system. If the response indicates that the data is not stored within the data storage system, the proxy interface 420 responds to the data exchange request with a request for transmission of the data to the data storage system.

In response to receiving a response from the proxy interface 420, the source file system interface transmits the data if requested to do so. Upon receipt of the data, the proxy interface 420 stores the data in the data cache 402. The file system interface 400 also sends an object exchange request to store the data to the common object store 408.

Data Cache

In an embodiment illustrated by FIG. 4, the data cache 402 is configured to store and stage data manipulated by the file system interface 400, the deduplication director 404, the inline deduplicator 406, and the common object store 408. In at least some embodiments, the data cache 402 is configured as a high performance, layered cache that can reside in kernel or user space. For example, the node 114a may be configured with a high-performance kernel bridge to the data cache 402. In an embodiment shown in FIG. 4, the data cache 402 includes a multi-level cache 414. The multi-level cache 414 may include a hardware peripheral (e.g., PCI-attached flash). As with other caches present in the data storage system, data stored in the data cache 402 is maintained therein as long as possible to fully utilize the speed of the cache for operations subsequent to storage of the data. The data cache may be implemented using one or more segments of dynamic memory, flash or other flash based media.

In one embodiment, the data cache 402 is configured as a transaction protected journal cache. In this embodiment, a sequence of data exchange requests (e.g., storage requests) may be journaled to an audit trail during a transaction. For example, a number of data exchange requests may represent a particular file to backup. In the event of a failure (process-level, subsystem-level, node-level, system-level, or other failure) the transaction may be rolled-back and the data cache 402 be unaffected. In one embodiment, the data cache 402 operates as a switch providing direct access to the object store 408 or indirect access through the inline deduplicator 406.

Process Management Component

In some embodiments, the process management component 418 is configured to manage processes executed by the node and exchange information descriptive of executed processes with other nodes. In some embodiments, the process management component 418 provides an interface through which components (e.g., the deduplication director 404 and the post-process deduplicator 410) can register to receive information regarding events detected by the process management component 418. Examples of events supported by the process management component 418 include data being stored within a data cache of a node, such as the data cache 402, and data being stored on a data storage device, such as the data storage device 118 described above with reference to FIG. 1.

Deduplication Director

Each node of the data storage system may receive numerous types of data to store. Examples of these types of data include full backups, incremental backups, multiplexed data, compressed data, and data generated by particular software programs according to predefined formats. To maximize data storage space utilization without encumbering speed, data (such as one or more files) may be ingested by a node, and managed by a deduplication director, such as the deduplication director 404. According to an embodiment illustrated by FIG. 4, the deduplication director 404 is configured to determine a deduplication template for data received and stored in the data cache 402. In some embodiments, upon initialization of the node, the deduplication director 404 registers for data storage events with the process management component 418 executed by the node. In this way, the deduplication director 404 configures the node to notify the deduplication director 404 in the event data is stored in the data cache 402.

In response to receiving information indicating that data has been stored in the data cache 402, the deduplication director 404 is configured to analyze characteristics of the data to identify one or more deduplication templates to apply to the data. The characteristics of the data used to determine the deduplication template may include a wide variety of information, such as file metadata (e.g., a file name, file extension), a source of the data (e.g., an identifier of a computer), and the actual content of the data (e.g., a header included in the data, a predefined number of bytes at specified location within the file, etc.). In at least one embodiment, the deduplication director 404 analyzes the actual content of the file to ensure that the content is indicative of data of the type specified by an identifier of the data (e.g., a file type at the end of a file name).

According to various embodiments, deduplication templates may specify a variety of options for deduplication processing. Examples of the options that a deduplication template may specify included duplication methods (e.g., summary-based, content-based, inline, post-process, etc.), compression options, and application specific content filter options. In some embodiments, the deduplication director 404 uses the actual content of the data to determine one or more application specific content filters to apply when determining where and which data to deduplicate.

After determining the one or more deduplication templates to apply, the deduplication director 404 applies the options specified in the one or more deduplication templates. For example, the deduplication director 404 may determine whether a deduplication template specifies processing of the data by at least one deduplication component (e.g., the inline deduplicator 406 or the post-process deduplicator 410). If the deduplication template does not specify processing of the data by at least one deduplication component, the deduplication director 404 transmits an object exchange request to the common object store 408. This object exchange request includes an identifier of the data and an indication that data is to be stored without segmentation or with minimal segmentation brought about from storing the data as objects within multiple extents.

If the deduplication template specifies processing of the data by at least one deduplication component, the deduplication director 404 segments or decomposes the data into multiple smaller data objects. The deduplication director 404 may segment the data into objects of a predefined size (e.g., 1 KB, 8 KB, 32 KB, 128 KB, or 32 MB) specified by a configurable parameter or may segment the data into objects of variable size (e.g., based on the content included within the data). The deduplication director 404 records defined data objects and associations between the data and the data objects within an object descriptor list, which is also referred to herein as an "object store map." One example of an object store map 504 is described further below with reference to FIG. 5. It is to be appreciated that, after "segmenting" the data into data objects, the data still resides within the data cache 402.

If the deduplication template specifies processing of the data by the post-process deduplicator 410 only, the deduplication director 404 transmits an object exchange request to the common object store 408. This object exchange request includes information specifying the data objects that correspond to the data and a request to store the data objects. If the deduplication template specifies processing of the data by the inline deduplicator 406, the deduplication director 404 transmits an inline deduplication request to the inline deduplicator 406. In one embodiment, the inline deduplication request includes information specifying the objects that correspond to the data.

In some embodiments, the deduplication director 404 applies multiple deduplication templates in series. Thus, embodiments are not limited to a particular deduplication template or set of deduplication templates.

In other embodiments, the deduplication director 404 may include deduplication software such as that disclosed in U.S. patent application Ser. No. 12/355,188, titled "SCALABLE DEDUPLICATION MECHANISM" and filed on Jan. 16, 2009 which is hereby incorporated by reference in its entirety. In these embodiments, the deduplication director 404 is configured to direct data to one of a plurality of deduplication domains based on the characteristics of the data or the presence or absence of specific metadata values associated with the data. According to these examples, the deduplication techniques employed by the components disclosed herein may be included in particular deduplication domains and thus be a to subset of the overall deduplication techniques implemented within the data storage system 104. As discussed above, embodiments disclosed herein are not limited to a particular type of data deduplication.

Figure 8:
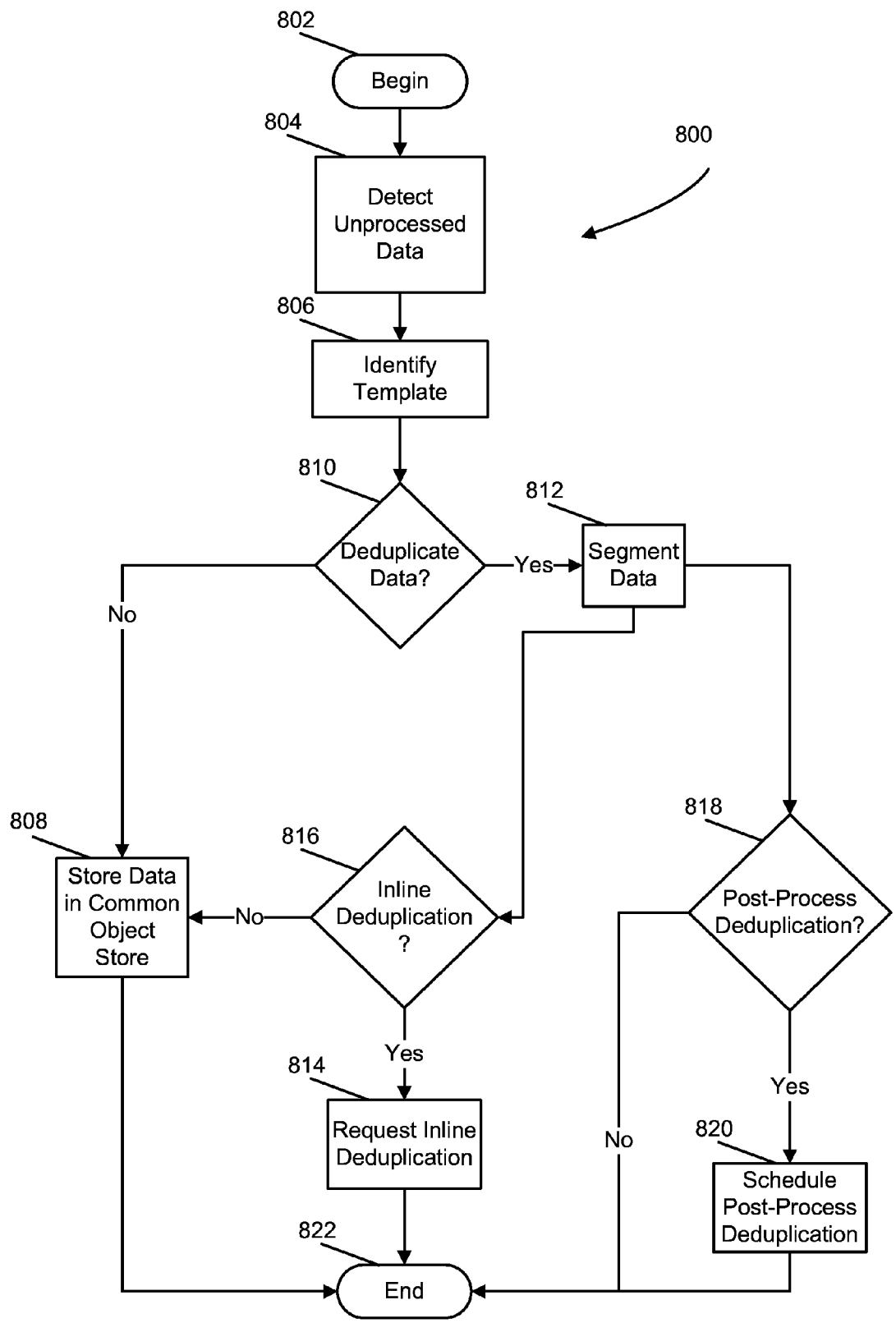
FIG. 8 is a flow diagram of a process of directing deduplication of data in accordance with an embodiment.

Examples of additional processes that the deduplication director 404 is configured to execute according to some embodiments are described further below with reference to FIG. 8.

Inline Deduplicator

In some embodiments, in response to receiving an inline deduplication request (and other requests from the file system interface 400 and the proxy interface 420), the inline deduplicator 406 is configured to determine whether any new data objects identified in the request is a copy of one or more existing data objects stored in the common object store 408. For each new data object that is a copy of an existing data object, the inline deduplicator 406 stores a reference to the existing data object in place of a duplicate copy of the new data object or, alternatively, stores the new data object and replaces the existing data object with a reference to the new data object. For each new data object that is not a copy of an existing data object, the inline deduplicator 406 catalogs the new data object by storing information descriptive of an identifier of the new data object (e.g., a hash value of the data object) and information descriptive of the location of the new data object in both a chronological tracking structure within an extent and a global index. The global index may be distributed to one or more nodes within the data storage system 104.

According to some embodiments, the inline deduplicator 406 is a summary-based deduplicator configured to determine whether a new data object is stored on the data storage system by searching common object store tracking structures stored in the data cache 402 (e.g., one or more chronological tracking structures) and the global index. In at least one embodiment, the chronological tracking structures are searched first as these structures are stored locally and accessible quickly. If the search fails, the inline deduplicator 406 transmits an object exchange request to the common object store 408. This object exchange request includes information specifying the new data object and a request to store the new data object.

If the search indicates that the new data object is a copy of an existing data object stored on the data storage system, the inline deduplicator 406 records the new data object as a reference object.

In some embodiments, the inline deduplicator 406 batches consultations of the chronological tracking structure into a predefined number of consultations (e.g., 20 or 30 requests). Prior to consulting the chronological tracking structure, the inline deduplicator 406 may sort the requests chronologically, which in turn may increase the efficiency of retrieval of the applicable extent(s) and chronological tracking structure(s) from the common object store 408. This is particularly beneficial where the common object store 408 will be required to retrieve the applicable extent from a persistent data storage device, such as the data storage device 118 described above with reference to FIG. 1.

In some embodiments, one or more application specific content filters and the inline deduplicator 406 are configured to determine whether a new data object includes a pattern of data that is easily compressible (e.g., includes a long series of 0's or 1's) or if the content of an object closely mirrors the content of another, existing object. In this situation, the inline deduplicator 406 may encode the content of the new data object in a compressed manner along with a reference to one or more existing data objects that closely mirror the encoded object to form a list of similar objects. New objects that are encoded in this way are referred to herein as "rule objects."

According to an embodiment illustrated by FIG. 4, the inline deduplicator 406 is configured to, after determining the new data object is a reference object or a rule object, transmit an object exchange request to the common object store 408. This object exchange request includes information specifying the data object and a request to store the data object according to its type (i.e., a request store a reference to the existing object and any additional data, such as an indication of the rule applicable to a rule object, required to recompose the new object when needed).

In some embodiments, the inline deduplicator 406 is configured to modify a map of the common object store 408, such as the object store map 504 described below with reference to FIG. 5. For example, in at least one embodiment, the inline deduplicator 406 transmits an object exchange request to store a new data object to the common object store 408. In response to receiving the object exchange request, the common object store 408 verifies the location and content of the new data object, generates a new OID that identifies the new data object, and returns the new OID to the inline deduplicator 406. Next, the inline deduplicator 406 receives the new OID and adds the new OID to the object store map.

Figure 9:
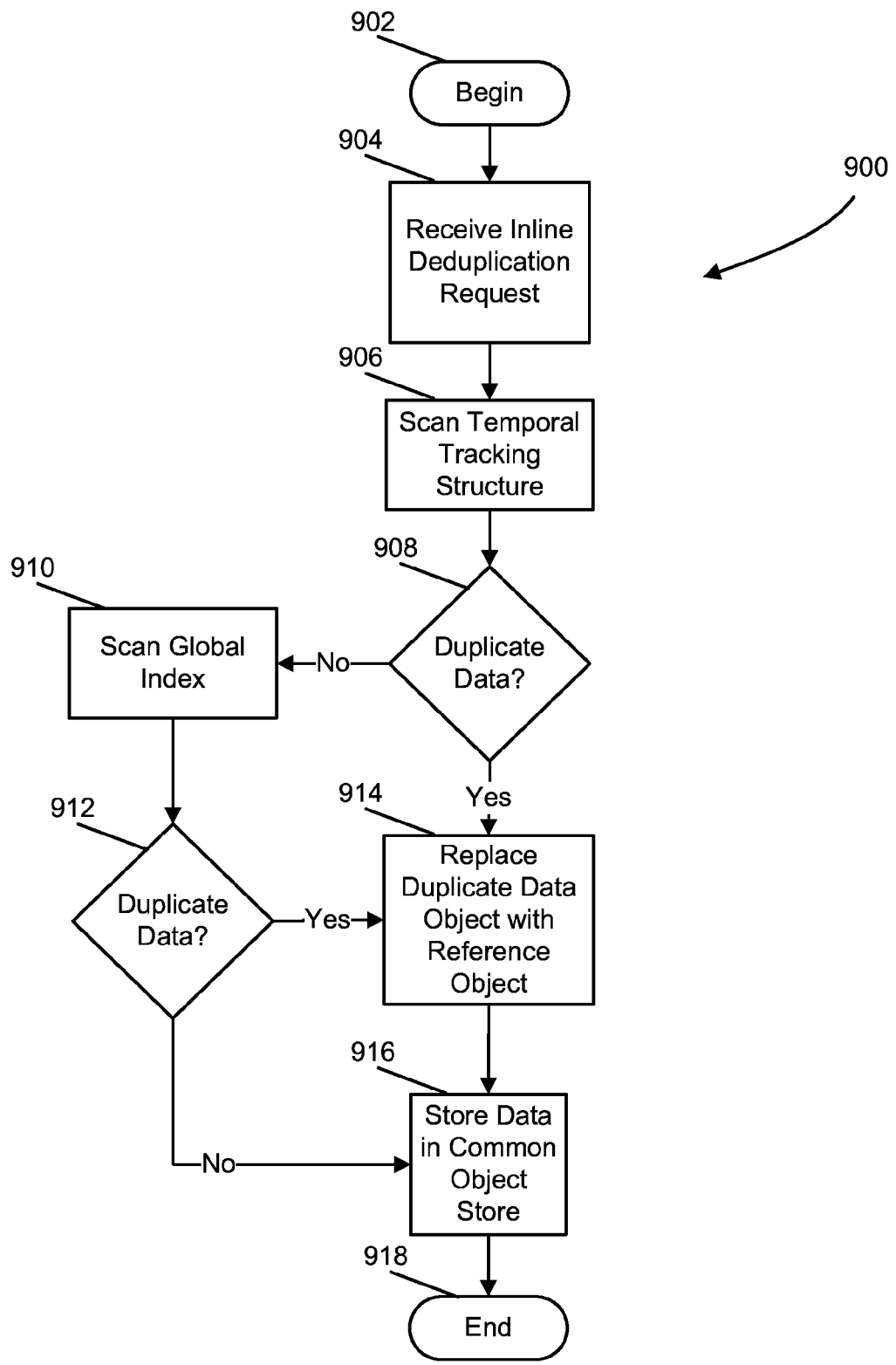
FIG. 9 is a flow diagram of a process for servicing an inline deduplication request in accordance with an embodiment.

Examples of additional processes that the inline deduplicator 406 is configured to execute according to some embodiments are described further below with reference to FIG. 9. In addition, while the inline deduplicator 406 described above is a summary-based deduplicator, in other embodiments, the inline deduplicator 406 is or includes a content-based deduplicator.

Common Object Store

In some embodiments illustrated by FIG. 4, the common object store 408 is configured to efficiently store, organize, and manage large data sets (e.g. data sets including a pedabyte or more of data). The common object store 408 includes a collection of executable components and data structures that persist data objects in long-term, non-transitory data storage (e.g., the data storage device 118). As discussed further below with reference to FIG. 5, the data structures of the common object store 408 enable the co-location of data which may have been manipulated by a variety of processes, such as inline and post-process deduplication processes.

Figure 5:
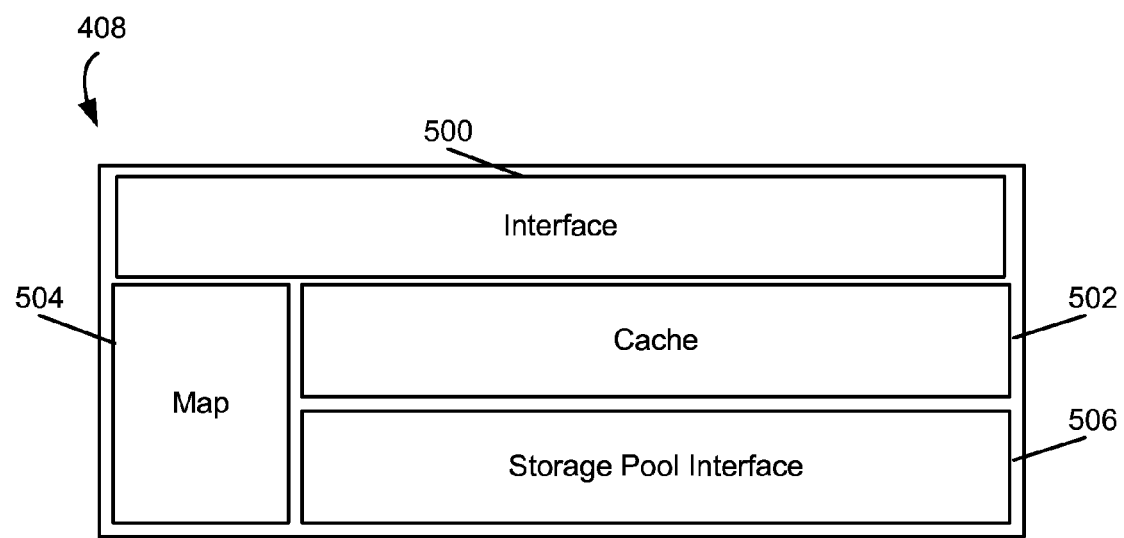
FIG. 5 is a block diagram of a common object store in accordance with an embodiment.

Now referring to FIG. 5, one example of a common object store, such as the common object store 408, is illustrated. The common object store includes an object store interface 500, an object store cache 502, an object store map 504, and a storage pool interface 506. In various embodiments, the object store interface 500, the object store cache 502, the object store map 504, and the storage pool interface 506 enable the object store to be a self-contained repository for the long-term storage of large data sets. As discussed further below, the collection of data structures implemented within the common object store includes data objects and extents.

In some embodiments, the object store interface 500 is configured to receive and process object exchange requests from other components, such as the file system interface 400, the deduplication director 404, the inline deduplicator 406, and the post-process deduplicator 410, in a uniform manner. These object exchange requests may include information indicating whether a data object identified in the request should be retrieved, stored, updated, verified, or deleted.

In response to receiving an object exchange request, the object store interface 500 is configured to identify the type of the request (e.g., whether the request is for a data object to be stored, retrieved, verified, updated, or deleted) and to process the request. Processing executed by the object store interface 500 in response to object exchange requests is described further below with reference to FIG. 10.

In some embodiments, the object store map 504 is configured to provide a cross-reference between data received by the data storage system and the data objects persistently stored within the data storage system. In these embodiments, the object store map 504 is structured to store a variety of metadata regarding the data objects stored within the common object store. Examples of this metadata include OIDs (and potentially other tracking structures) for the data objects, associations between the data objects and the data originally received for storage in the data storage system, and location and placement information describing where the data objects are stored within persistent data storage, such as the data storage device 118 described above with reference to FIG. 1.

In some embodiments, the OID is received with the data object from an inline deduplicator, such as the inline deduplicator 406 described above with reference to FIG. 4. OIDs may act both as identifiers and verifiers. As described above, values of OIDs may include hash values or a similar checksums. Thus, storing the OID value associated with each data object provides data for a basic cyclic redundancy check (CRC) to ensure the accuracy of the object data. The associations between the data objects and the data originally received for storage in the data storage system may be implemented as associations between OIDs and file names or some other identifier of the originally received data. The file location and node placement information may be implemented as associations between OIDs and identifiers of nodes and extents containing the data objects corresponding to the OIDs.

By storing, retrieving, deleting, and updating entries within the object store map 504, the components of the data storage system are able to maintain correspondence between data received, the data objects containing the received data, and the extents containing the data objects.

In some embodiments, the object store map 504 is implemented using multiple, separate data structures. Associations between OIDs and identifiers of original data may be stored separately from associations between OIDs and file placement and node information. More particularly, in these embodiments, the object store map 504 includes an index with entries that associate one or more OIDs with the file placement information and node placement information (e.g., an identifier of a node with the data object identified by the OID store in its data cache).

According to some embodiments, the object store map 504 is stored within the common object store in a manner similar to other data. This enables the data storage system 104 to recover a crashed node by retrieving information stored in the common object store. In at least one embodiment, the object store map 504 is deduplicated in accordance with aspects and embodiments disclosed herein.

In some embodiments, the common object store is configured to receive and process multiple object exchange requests for data objects having multiple differing sizes (e.g., 1 KB, 8 KB, 32 KB, 128 KB, or 32 MB). When the data objects are written, they may be organized and stored in extents. Extents may be a predetermined size (e.g., 32 MB, 64 MB, etc.) and the size may be adjusted during operation of a node. In one embodiment, a node may read a parameter, such as the "maxExtentSize" parameter, which governs extent size. Each extent may include metadata that comprises information associated with data object locations and type of data objects in the extent. For example, the metadata associated with a data object may include a starting location and length of the data object within the extent. The metadata may form a chronological tracking structure at the front of the extent (or located elsewhere within the extent).

Figure 6:
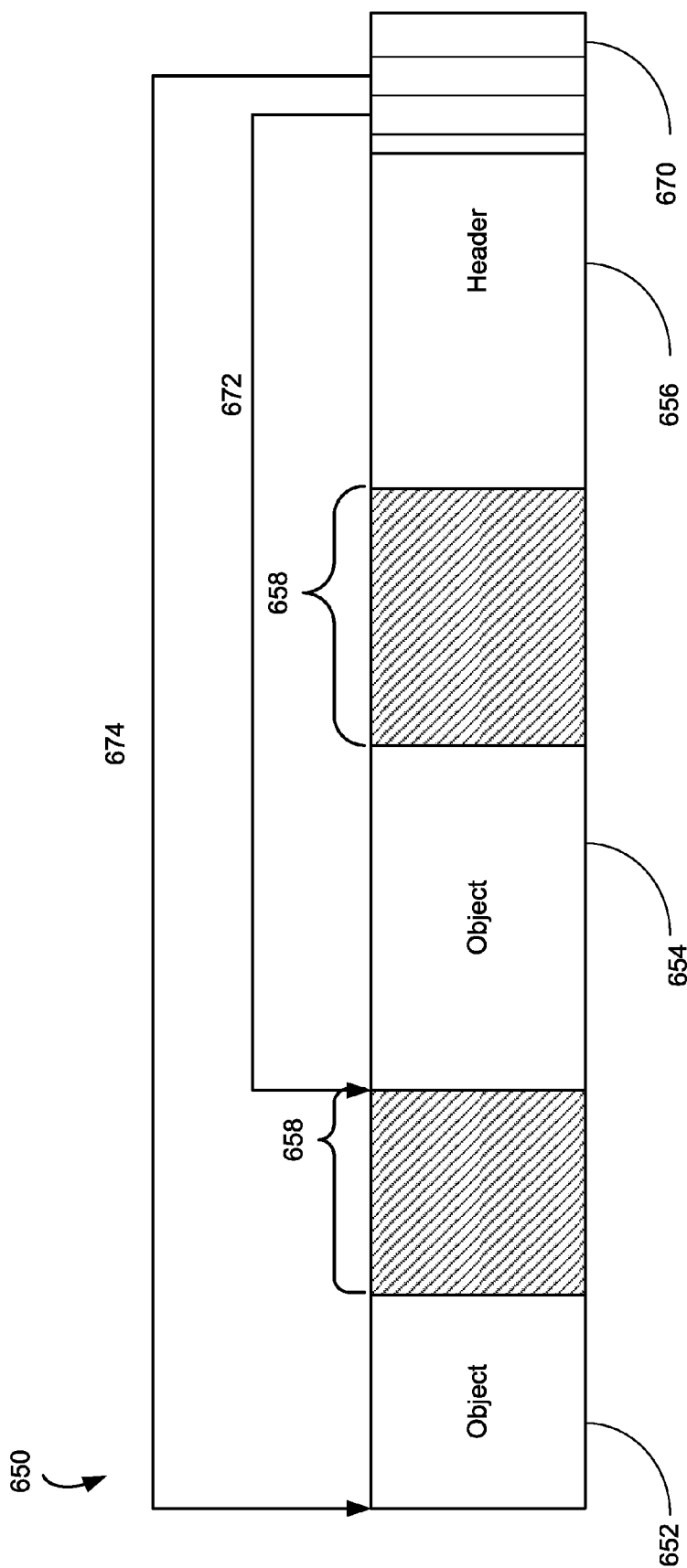
FIG. 6 is a block diagram of an extent utilized by the common object store in accordance with an embodiment.

One example of an extent is illustrated with reference to FIG. 6. As illustrated, FIG. 6 includes an extent 650. The extent 650 includes a first object 652, a second object 654, a header 656, unused space 658, and a chronological tracking structure 670. When extents are initially created by the common object store 408, the common object store 408 may pack the extents according to an extent packing process. In at least one embodiment, the extent packing process transfers data objects stored in a shared cache, such as the data cache 402 described above with reference to FIG. 4, to a private cache, such as the object store cache 502 or an identified portion of the data cache 402. One example of such an extent packing process is described further below with reference to FIG. 12. This extent packing process may include the creation and modification of the chronological tracking structure 670 within a portion of the extent. The portion may be contiguous or partitioned and may be positioned at or near the front of the extent, the end of the extent, the middle of the extent or elsewhere. In one embodiment illustrated by FIG. 6, the chronological tracking structure 670 is located in the header 656 and includes a list of OIDs and offsets into the extent where the objects corresponding to the OIDs are stored. The OIDs and the offsets are illustrated in FIG. 6 as lines 672 and 674. In some embodiments, the chronological tracking structure is ordered according to the order in which data is received and stored. In at least one embodiment, the chronological tracking structure includes information identifying the location of portions of data within the extent (e.g., offsets within the extent, length, etc.). This information may be used by the process of FIG. 13 for subsequent retrieval and reconstruction of requested data.

In other embodiments, the chronological tracking structure 670 may include other metadata, associations between the stored data and objects, associations between the stored data with files, identifiers of the stored data, summaries (e.g., fingerprints or other hashes) of the stored data, deduplication history of the stored data, CRC's of the stored data, types of the stored data (e.g., normal object or a rule object), and pointers (extent identifier, offset, and OID) to data stored in other extents. It is appreciated that this wealth of metadata enables the common object store to support both summary-based and content-based deduplication processes by providing a common object format in which to identify, describe, store, and link data.

Although according to an embodiment illustrated in FIG. 6, the extent 650 includes the free space 658 between objects, the extent packing process may be configured to organize objects with no free space between objects. In some embodiments, processes such as the post-process deduplication process discussed below with reference to FIG. 14, may free space in extents as duplicate objects, or portions of duplicate objects, are de-referenced and removed from storage. In an embodiment illustrated by FIG. 6, the free space 658 may be the result of such a post-process deduplication process.

Objects, such as the objects 652 and 654, are splittable, variably sized, and re-locatable within the extent 650. In at least one embodiment, objects may be re-locatable to other extents stored within the common object store 408. As described above, objects may be addressed by an identifier which may be referred to herein as an OID. Objects may also include reference counts which indicate whether other data objects in the common object store 408 reference data within the object. In some embodiments, the storage pool interface 506 is configured to store objects to a persistent data storage device, such as the storage device 118 described above with reference to FIG. 1. In one embodiment, the storage device 118 may be a hard drive local to a node, such as the node 114a. In other embodiments, the storage device 118 may be a network attached storage device (NAS) or other remote data store. In various embodiments, the storage pool interface 506 may be configured to directly commit writes to disk (e.g., by writing sectors) or may be configured to commit writes to a traditional file system. For example, the storage pool interface 506 may create a "virtual" file system by pre-allocating one or more files in the traditional file system. In this example, the storage pool interface writes extents and their associated objects within the pre-allocated files. In other examples, extents and their associated objects are written directly to disk without the aid of a traditional file system (i.e., direct-write to sectors).

Examples of additional processes that the common object store 408 is configured to execute according to some embodiments are described further below with reference to FIGS. 10-13.

Object Database

In an embodiment illustrated by FIG. 4, the object database 416 includes a "logical metadata cache" that stores metadata relating to data that is received from one or more computer systems, such as the computer systems 100a-100n of FIG. 1, and stored in the common object store 408. Examples of metadata that may be stored in the logical metadata cache include location identifiers, fingerprints (both micro and macro), data size, logical or physical location of the data in primary storage (e.g., one or more storage pool locations), one or more hash values representing the data, the creation date of the data, the date of the last modification of the data, the backup policy name under which the data was stored, an identifier, e.g. a name or watermark, of the data and the data type of the data, e.g. a software application associated with the data. In various examples, the post-process deduplicator 410 uses the data stored in the object database 416 in a variety of ways, as is discussed more fully below.

Post-Process Deduplicator

According to a variety of embodiments, data may be persisted (e.g., in the data storage device 118) by the common object store 408. In some situations, the data may not be fully deduplicated by inline deduplication processes. For example, the common object store 408 may receive data partitioned into a first set of objects according to a first distribution at a specific point in time. The common object store 408 may then receive the same data partitioned into a second set of objects according to a second distribution at a later point in time. If the first distribution is different from the second distribution, the inline deduplicator 406 may not detect duplicate data within the objects. Similarly, if duplicate data is included with non-duplicate data in a data object, the inline deduplicator 406 may not detect the duplicate data. Further, inline deduplication may be bypassed where the amount of data being ingest at a specific point in time requires storage of the inbound data without the resource overhead associated with inline deduplication.

In some embodiments, the duplicate data may be removed through the use of the post-process deduplicator 410. In these embodiments, the post-process deduplicator 410 is content-based deduplicator configured to interact with the common object store 408 to identify and remove the duplicated data from the common object store 408. For example, according to one embodiment, the post-process deduplicator 410 navigates two groups of objects to locate data objects that may include duplicate data. For instance, the post-process deduplicator 410 may identify two data objects that include non-duplicate data along with duplicate data. Similarly, the post-process deduplicator 410 may identify duplicate data spanning data object boundaries. Specific processes related to the post-process deduplicator 410 are described within U.S. patent application Ser. No. 13/911, 482, titled "SYSTEM AND METHOD FOR MULTI-SCALE NAVIGATION OF DATA" ("the Multi-Scale Application") which was filed on Jun. 6, 2013 and which is hereby incorporated herein by reference in its entirety. In some embodiments, after identifying duplicate data, the post-process deduplicator 410 alters the boundaries of the data objects (i.e., re-segment the data objects) to isolate the duplicate data into distinct data objects, deletes an instance of the, now duplicate, data objects, and alters the metadata associated with the deleted instance to refer to the remaining instance of the data object. Examples of processes executed by the post-process deduplicator 410 are described further below with reference to FIG. 14. In addition, while the post-process deduplicator 410 described above is a content-based deduplicator, in other embodiments, the post-process deduplicator 406 is or includes a summary-based deduplicator.

It is appreciated that, in some embodiments, the post-process deduplicator 410 may determine one or more nodes upon which to execute based on the current workload of the nodes. Examples of additional processes that the post-process deduplicator 410 is configured to execute according to some embodiments are described further below with reference to FIG. 14.

The embodiments disclosed herein are not limited to the particular arrangement of components illustrated in FIGS. 4 and 5. For example, in at least one embodiment, the deduplication director 404 may execute on a node separate from the other components. In other embodiments, one or more of the file system interface 400, the deduplication director 404, the inline deduplicator 406, the common object store 408, and the post-process deduplicator 410 may be distributed to one or more computer systems without departing from the scope of this disclosure.

Hybrid Deduplication Processes

Various embodiments include processes of storing and protecting data. In some embodiments, stored data is deduplicated using a variety of deduplication processes and platforms in parallel. These processes may be executed by a variety of the components of the data storage system described above.

File System Interface Processes

Figure 7:
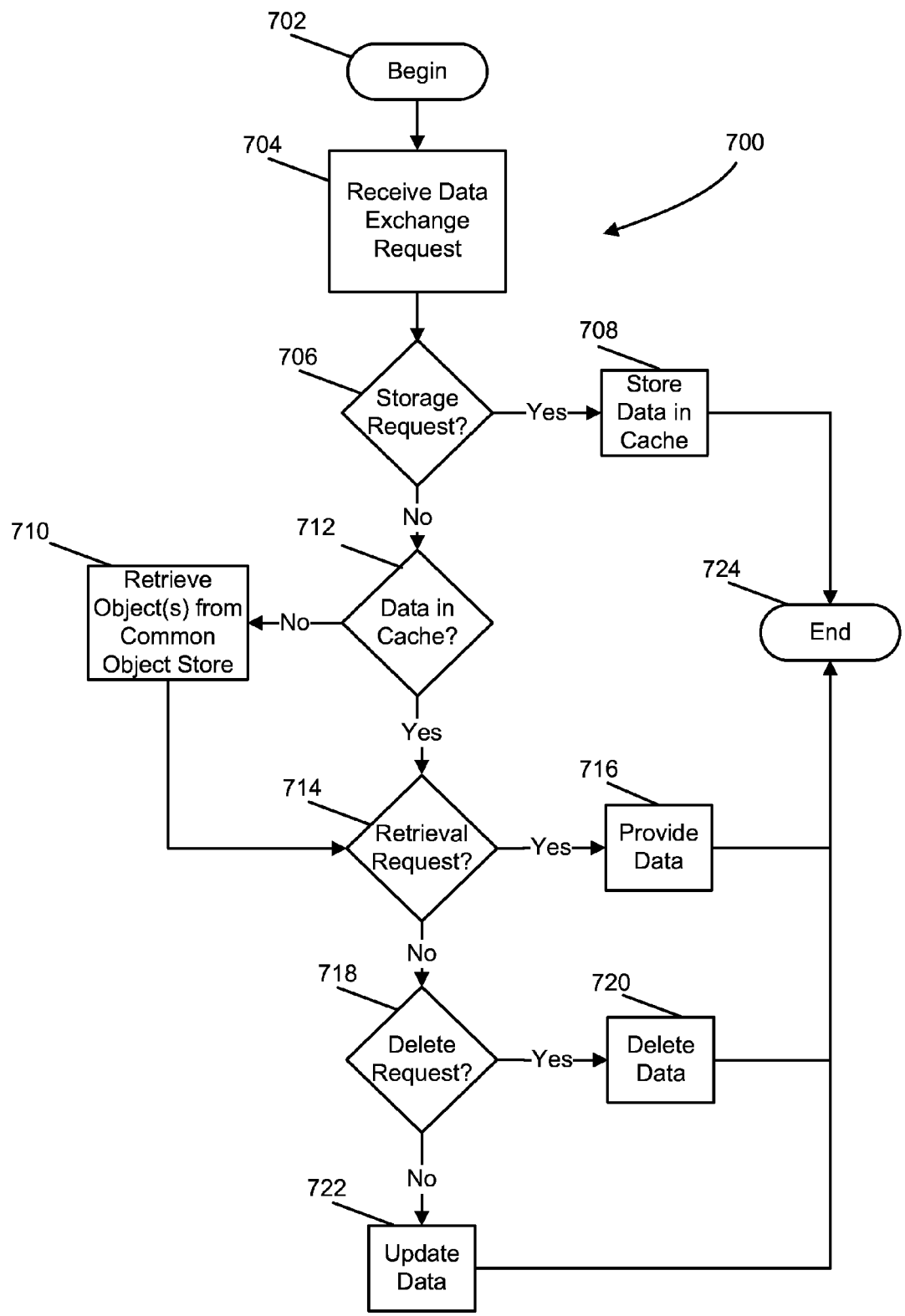
FIG. 7 is a flow diagram of a process of servicing a data exchange request in accordance with an embodiment.

Various embodiments include processes that support file system interaction between a data storage system, such as the data storage system 104 described above with reference to FIG. 1 and other computer systems, such as the computer systems 101a-101n described above with reference to FIG. 1. FIG. 7 illustrates one such interface process 700 that is executed by a file system interface, such as the file system interface 400 described above with reference to FIG. 4. As illustrated in FIG. 7, the interface process 700 includes several acts that support data exchange requests and responses. The interface process 700 begins at 702.

In act 704, a computer system executing the interface process 700 receives a data exchange request from a requesting process. This requesting process may execute on the computer system including the interface process 700 or another, distinct computer system. The data exchange request may include metadata regarding data identified in the request (e.g., a filename) of the data.

In act 706, the computer system determines whether the data exchange request is a storage request. If so, the computer system executes act 708. In the act 708, the computer system stores the data identified by the storage request in a data cache, such as the data cache 402 described above with reference to FIG. 4, notifies the requesting process of the successful completion of the storage request, and proceeds to 724.

If the data exchange request is not a storage request, the computer system executes act 712. In the act 712, the computer system determines whether the data identified by the data exchange request is stored at a location in the data cache. If so, the computer system executes act 714. Otherwise, the computer system executes act 710.

In the act 710, the computer system consults a data to data object cross-reference to identify a set of data objects that contain the data. This data to data object cross-reference may include, for example, the object store map 504 described above with reference to FIG. 5. Next, within the act 710, the computer system generates one or more object exchange requests to retrieve the set of data objects and communicates the request(s) to a common object store, such as the common object store 408 described above with reference to FIG. 4. In response to the common object store providing the set of data objects, the computer system reconstructs and stores the data contained within the data objects at a location in the data cache and executes the act 714.

In the act 714, the computer system determines whether the data exchange request is a retrieval request. If so, the computer system executes act 716. In the act 716, the computer system provides the data at the location in the data cache to the requesting process and proceeds to 724.

If the data exchange request is not a retrieval request, the computer system executes act 718. In the act 718, the computer system determines whether the data exchange request is a delete request. If so, the computer system executes act 720. In the act 720, the computer system deletes the data from the location in the data cache and proceeds to 724.

If the data exchange request is not a delete request, the computer system executes act 722. In the act 722, the computer system updates the data at the location in the data cache and proceeds to 724. At 724, the interface process 700 ends.

Processes in accord with the interface process 700 enable data storage systems to support common file system interface protocols while obfuscating details of an underlying common object store implementation.

Deduplication Directing Processes

Various embodiments include processes that analyze data to determine processes that are best suited for deduplicating the data. These processes may be executed by a data storage system, such as the data storage system 104 described above with reference to FIG. 1. FIG. 8 illustrates one such deduplication directing process 800 that is executed by a deduplication director, such as the deduplication director 404 described above with reference to FIG. 4. As illustrated in FIG. 8, the deduplication directing process 700 includes several acts that support segmentation and deduplication of data. The deduplication directing process 800 begins at 802.

In act 804, a computer system executing the deduplication directing process 800 detects that unprocessed data is stored in a data cache, such as the data cache 402 described above with reference to FIG. 4. For instance, a process manager such as the process manager 418 described above with reference to FIG. 4, may detect storage of the unprocessed data and notify other processes, such as the deduplication director, of the storage event.

In act 806, the computer system analyzes the unprocessed data and identifies a deduplication template applicable to the unprocessed data. As described above with reference to the deduplication director 404 of FIG. 4, the deduplication template may specify a variety of deduplication options to be applied to the unprocessed data. In act 810, the computer system determines whether the deduplication template specifies that the unprocessed data be deduplicated. If so, the computer system executes act 812 and segments the unprocessed data into data objects. Otherwise, the computer system executes act 808 and proceeds to 822. In the act 808, the computer system issues an object exchange request to store the unprocessed data as a single, unsegmented data object in a common object store, such as the common object store 408 described above with reference to FIG. 4. It is appreciated that even an unsegmented data may be stored by the common object store within one or more extents.

In the act 816, the computer system determines whether the deduplication template specifies that the unprocessed data be deduplicated inline. If not, the computer system executes the act 808 and stores, in the common object store, the data objects into which the unprocessed data was segmented. Otherwise, the computer system executes act 814 and proceeds to 822. In the act 814, the computer system sends an inline deduplication request to an inline deduplicator, such as the inline deduplicator 406 described above with reference to FIG. 4. The inline deduplication request may specify the data objects into which the unprocessed data was segmented.

In the act 818, the computer system determines whether the deduplication template specifies that the unprocessed data be deduplicated post-process. If not, the computer system proceeds to 822. Otherwise, the computer system executes act 820 and schedules the unprocessed data for post-process deduplication by a post-process deduplicator, such as the post process deduplicator 410 described above with reference to FIG. 4. The post-process deduplicator may deduplicate the unprocessed data after the unprocessed data is stored in the common object store as a set of one or more data objects or as unsegmented data. At 822, the deduplication directing process 800 ends.

Processes in accord with the deduplication directing process 800 enable data storage systems to implement deduplication approaches that are customized to the characteristics of the data being deduplicated. Through this customization, deduplication performance may be balanced against computing resource consumption to provide high value data protection solutions.

Inline Deduplication Processes

Various embodiments include processes that deduplicate data received for storage prior to storing the data in persistent data storage. These processes may be executed by a data storage system, such as the data storage system 104 described above with reference to FIG. 1. FIG. 9 illustrates one such summary-based deduplication process 900 that is executed by an inline deduplicator, such as the inline deduplicator 406 described above with reference to FIG. 4. The deduplication directing process 900 begins at 902.

In act 904, a computer system executing the deduplication process 900 receives an inline deduplication request from a requesting process, such as the deduplication director. This requesting process may be executing on the computer system executing the deduplication process 900 or another, distinct computer system. The deduplication request may include metadata regarding the data object subject to the request, such as an identifier (e.g., an OID) of the subject data object.

In act 906, the computer system scans a temporal tracking structure for OIDs that match the OID of the subject data object. The temporal tracking structure may be located, for example, in an extent stored within a data cache, such as the data cache 402 described above with reference to FIG. 4. If the computer system finds a matching OID, the computer system executes act 914 and replaces the subject data object with a reference object. Otherwise, the computer system executes act 910.

In the act 910, the computer system scans a global index for OIDs that match the OID of the one or more data objects. The global index may be a distributed index with portions located within one or more data caches within one or more computer systems. If the computer system finds a matching OID, the computer system executes act 914 and replaces the subject data object with a reference object. Otherwise, the computer system executes act 916 and proceeds to 918.

In the act 916, the computer system issues an object exchange request to store the subject data object or the reference data object (if duplicate data was discovered) in a common object store, such as the common object store 408 described above with reference to FIG. 4. At 918, the deduplication process 900 ends.

Processes in accord with the deduplication process 900 enable data storage systems to prevent duplicate data from unnecessarily consuming scarce computing resources.

Common Object Store Processes

Figure 10:
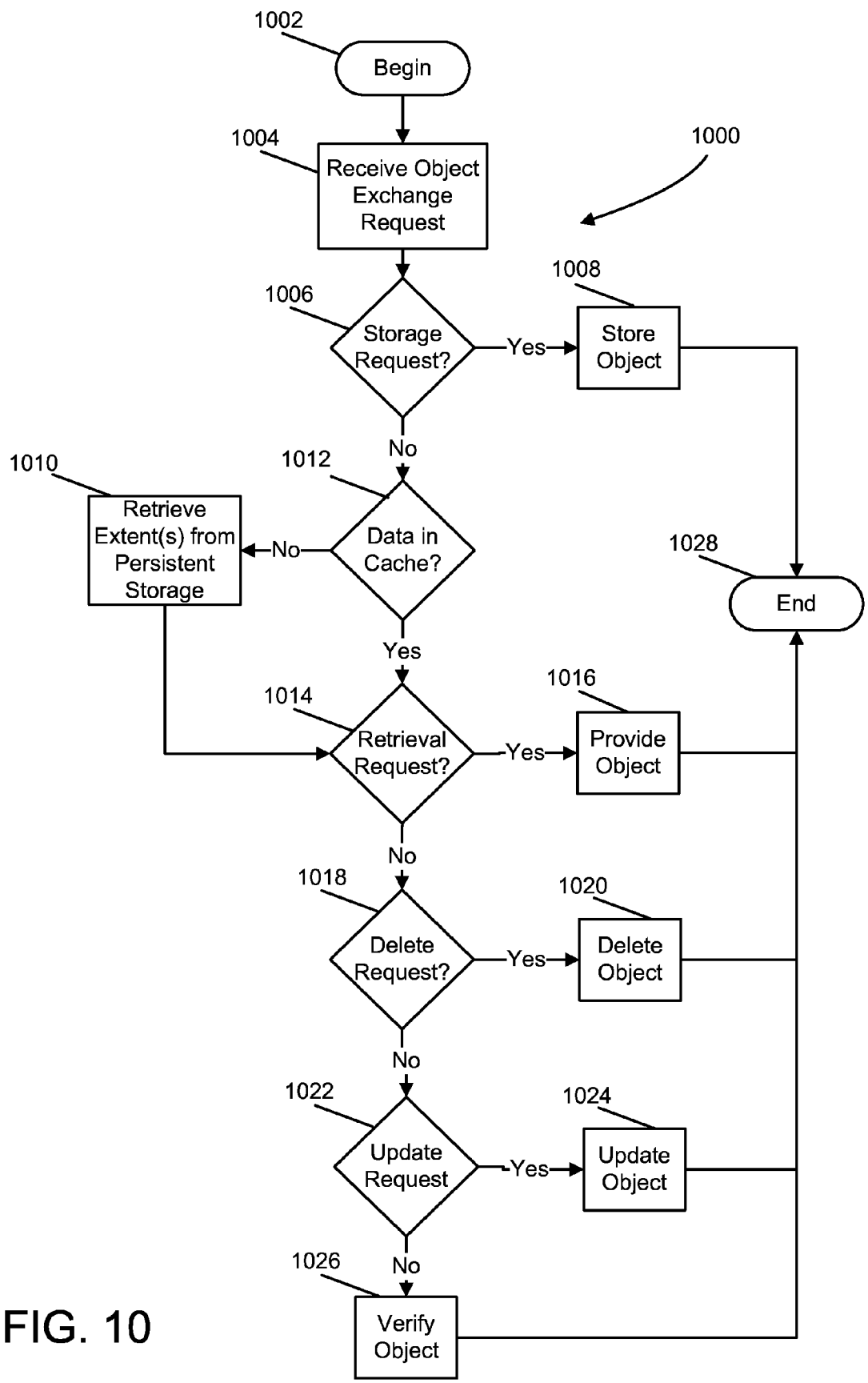
FIG. 10 is a flow diagram of a process for servicing an object exchange request in accordance with an embodiment.

Various embodiments include processes that manipulate data within the common object store. FIG. 10 illustrates one such object manipulation process 1000 that is executed by a object store interface, such as the object store interface 500 described above with reference to FIG. 5. As illustrated in FIG. 10, the object manipulation process includes several acts that support object exchanges requests and responses. Object manipulation process 1000 begins at 1002.

In act 1004, a computer system executing the object manipulation process 1000 receives an object exchange request from a requesting process. This requesting process may execute on the computer system including the object manipulation process 1000 or another, distinct computer system. The object exchange request may include metadata regarding a data object subject to the request, such as an identifier (e.g., an OID) of the data object.

In act 1006, the computer system determines whether the object exchange request is a storage request. If so, the computer system executes act 1008. In the act 1008, the computer system verifies the location and identity of the data object identified in the storage request and stores the data object within an extent in a data cache. The computer system may compress the data object while storing the data object in the extent. The data cache may be or include the data cache 402 described above with reference to FIG. 4. Also within the act 1008, the computer system updates metadata associated with the data object and the extent. For example, the computer system may update a chronological tracking structure associated with and included within the extent to include an OID, start offset, and ending offset (or length) of the data object. Further within the act 1008, the computer system also responds to the requesting process with an OID and proceeds to 1028. The OID may be subsequently stored, by the requesting process, in an object store map, such as the object store map 504 described above with reference to FIG. 5.

If the object exchange request is not a storage request, the computer system executes act 1012. In the act 1012, the computer system determines whether the data object identified by the object exchange request is stored in the data cache. If so, the computer system executes act 1014. Otherwise, the computer system executes act 1010.

In the act 1010, the computer system consults a data object to extent cross-reference to identify a set of extents that contain the data object. This data object to extent cross-reference may include, for example, the object store map. In one embodiment, during the execution of the act 1010, the computer system may determine that the data object references other objects (e.g., as a result of a deduplication process). In this embodiment, the computer system identifies, within the set of extents, the extent(s) that contains the referenced object. Next, within the act 1010, the computer system generates one or more requests to retrieve the set of extents from persistent storage and communicates the request(s) to a persistent data storage, such as the data storage device 118 described above with reference to FIG. 1. In response to the persistent data storage providing the set of extents, the computer system reconstructs the data object from the set of extents and stores the data object contained within the set of extents in the data cache and executes the act 1014.

In the act 1014, the computer system determines whether the object exchange request is a retrieval request. If so, the computer system executes act 1016. In the act 1016, the computer system provides the data object in the data cache to the requesting process and proceeds to 1028.

If the object exchange request is not a retrieval request, the computer system executes act 1018. In the act 1018, the computer system determines whether the object exchange request is a delete request. If so, the computer system executes act 1020. In the act 1020, the computer system deletes the data object from the data cache and proceeds to 1028.

If the object exchange request is not a delete request, the computer system executes act 1022. In the act 1022, the computer system determines whether the object exchange request is an update request. If so, the computer system executes act 1024. In the act 1020, the computer system updates the data object in the data cache and proceeds to 1028.

If the object exchange request is not an update request, the computer system executes act 1026. In the act 1026, the computer system recalculates the OID of the data object, reports to the requesting process whether any difference exist between the OID and the recalculated OID, and proceeds to 1028. At 1028, the object manipulation process 1000 ends.

Processes in accord with the object manipulation process 1000 enable components of data storage systems to store data objects in a flexible container format that facilitates efficient and scalable processing of large sets of data. Moreover, these processes enable the retrieval and reconstruction of a data objects from the common object store regardless of the deduplication method employed by a node. In various embodiments data objects are stored sequentially over time. For this reason, a first data object exchange request to retrieve a data object may load one or more extents that contain many additional data objects. Subsequent requests may target these additional data objects (as they may be related by time, originating client, etc). Accordingly, these additional data objects are already loaded within the data cache and may be retrieved significantly faster than when retrieving them individually from persistent data storage.

Figure 11:
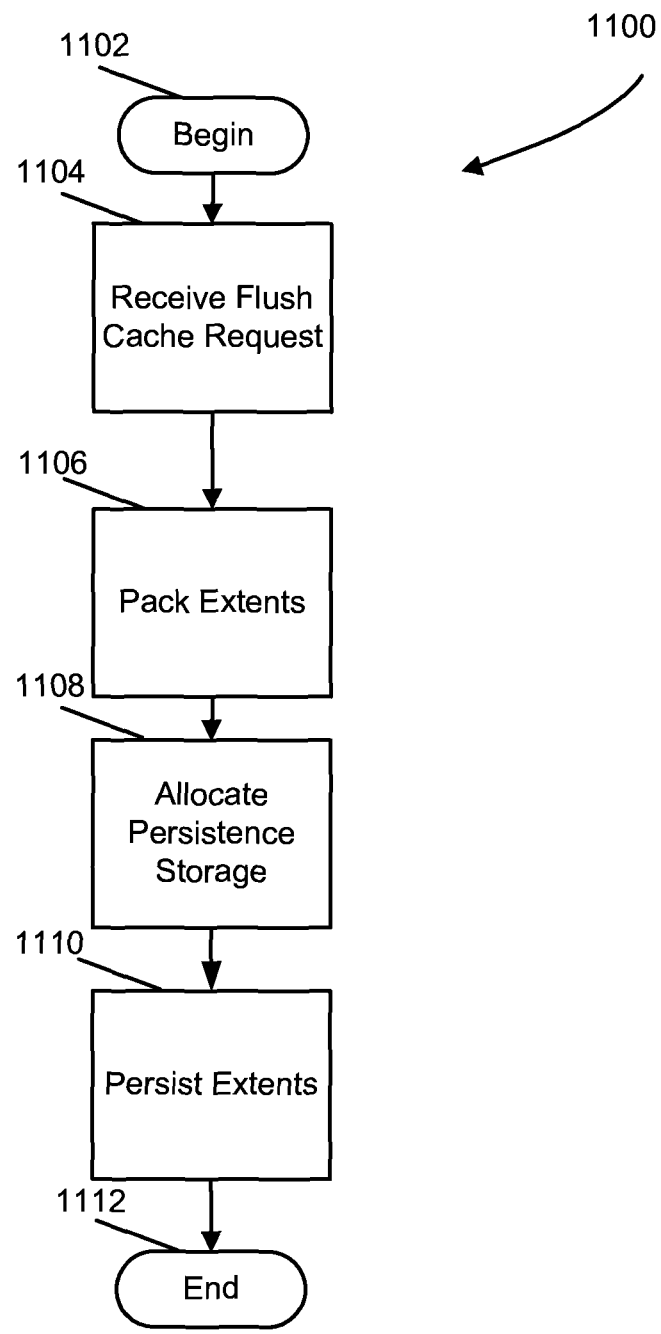
FIG. 11 is a flow diagram of a process for servicing a flush cache request in accordance with an embodiment.

Various embodiments include processes that persist data stored in a data cache, such as the data cache 402 described above with reference to FIG. 4, into persistent data storage, such as the data storage device 118 describe above with reference to FIG. 1. These processes may be executed by a data storage system, such as the data storage system 104 described above with reference to FIG. 1. FIG. 11 illustrates one such storage process 1100 that is executed by an object store interface, such as the object store interface 500 described above with reference to FIG. 5. As illustrated in FIG. 11, the storage process 1100 includes several acts that manipulate and transfer data to persistent data storage. The storage process 1100 begins at 1102.

In act 1104, a computer system executing the storage process 1100 receives a flush cache request from a requesting process, such as the process manager 418 describe above with reference to FIG. 4. This requesting process may execute on the computer system including the storage process 1100 or another, distinct computer system. The flush cache request may include metadata regarding a data object subject to the request, such as an identifier (e.g., an OID) of the subject data object. Alternatively, the flush cache request may indicate that all data objects stored in an extent, in the data cache, or in a portion thereof, are subject to the request.

As with other inter-process communications disclosed herein (requests, responses, etc.), in some embodiments, a flush cache request may be implemented as a remote procedure call (RPC). It is appreciated that the RPC may not contain the actual data to be written; rather, the RPC request may define a plurality of locations in the data cache to locate data to be written. It should be appreciate that the data to be written may include tens/thousands of megabytes, and for this reason, it may be advantageous to only pass the plurality of locations (or a pointer to an array of locations) in the RPC request.

In act 1106, the computer system stages an extent within a dedicated cache, such as the object store cache 502 describe above with reference to FIG. 5. Within the act 1106, the computer system may copy the subject data objects from the data cache to the extent within the dedicated cache and compress the data objects during the copy operation. In some embodiments, the computer system stores some data essentially "as-is." In these embodiments, the computer system divides data that is larger than an extent into multiple extents. Thus, in these embodiments, "as-is" or "unsegmented" data is stored with minimal segmentation brought about from recording the data within multiple extents.

In some embodiments, the computer system packs the extent with compressed data objects to minimize or eliminate free space between compressed data objects. When the computer system positions and stores a compressed data object within an extent, the computer system updates the chronological tracking structure located within the extent. Each subsequent compressed data object added to the extent thus causes the computer system to add a corresponding identifier to the chronological tracking structure. The identifier may include OID and other metadata associated with the data object, such as a start and end offset within the extent of the object data. The extent may be sized according to a configurable parameter to enable the extent to adhere to an "on-disk" format and thereby be efficiently stored to and retrieved from persistent data storage.

In act 1108, the computer system allocates, via a storage pool interface such as the storage pool interface 506 described above with reference to FIG. 5, data storage space for the extent. In some embodiments, the computer system may allocate space within a conventional file system file. In other embodiments, the computer system may allocate space using sector-level commands.

In act 1112, the computer system copies, via the storage pool interface, the staged extent to the persistent storage and proceeds to 1112. In some embodiments, within the act 1112, the computer system updates an object store map, such as the object store map 504 described above with reference to FIG. 5. This update may include metadata associated with the objects (e.g., OID, offset, data length, object type, etc). At 1112, the storage process 1100 ends.

Processes in accord with the storage process 1100 enable data storage systems to pack extents with data objects in a manner that makes efficient use of data storage space and that prompts fast disk input/output. In various embodiments, the common object store may retain the recently-flushed extents in the object store cache. The object store cache 502 may be advantageously used to efficiently retrieve cached data objects for subsequent data object retrieval requests.

Post-Process Deduplication Processes

Figure 12:
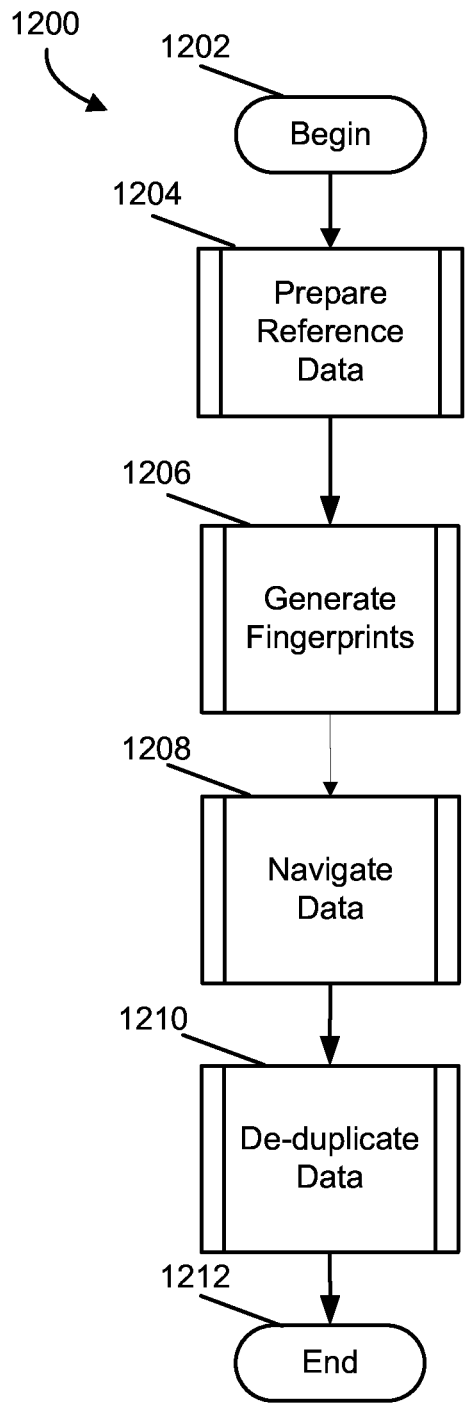
FIG. 12 is a flow diagram of a process of deduplicating data in accordance with an embodiment.

Various embodiments include processes of deduplicating data previously stored within a data storage system specially configured to perform the functions disclosed herein. FIG. 12 illustrates one such content-based deduplication process 1200 that is executed by a post-process deduplicator, such as the post-process deduplicator 410 described above with reference to FIG. 4. As illustrated in FIG. 12, the deduplication process 1200 includes acts of preparing reference data, generating fingerprints, navigating data, and deduplicating data. Process 1200 begins at 1202.

In act 1204, reference data is prepared for deduplication. According to various examples, the post-process deduplicator prepares the reference data by first selecting a group of one or more objects to serve as the reference data. In one embodiment, the post-process deduplicator selects a group of recently received objects that include data that has not previously been processed by the post-process deduplicator. The post-process deduplicator may make this selection via one or more queries to an object database, such as the object database 416 described above with reference to FIG. 4. The selected object group may include data corresponding to backups taken at different times using different methodologies (e.g., full or incremental backups).

Once an object group is selected as the reference data, the post-process deduplicator determines whether the object group resides in a data cache, such as the data case 402 described above with reference to FIG. 4. If so, the post-process deduplicator executes act 1206. Otherwise the post-process deduplicator interfaces with a common object store, such as the common object store 408 described above with reference to FIG. 4, to retrieve and place one or more extents including the data objects that comprise the object group into the data cache. In one embodiment, the common object store utilizes an object store map, such as the object store map 504 described above with reference to FIG. 5, to locate the one or more extents.

In act 1206, the reference data is fingerprinted according to aspects and embodiments disclosed herein and in the Multi-Scale Application. In one embodiment, the post-process deduplicator processes the reference data in 1 GB regions. In some embodiments, the post-process de-duplicator generates both micro-fingerprints and macro-fingerprints within the act 1206. As described in the Multi-Scale Application, micro-fingerprints may include one or more prioritized sets of hash values that are calculated from portions of the reference data. The boundaries of these portions may be content driven or spaced according to a predefined width (i.e., amount of data). The macro-fingerprint may, in turn, be prioritized sets of the hash values that make up the micro-fingerprints. In one embodiment, the macro-fingerprints are stored in the object database and the micro-fingerprints are stored within an extent including the objects summarized by the micro-fingerprints. It is appreciated that both the macro-fingerprints and the micro-fingerprints may be stored in other locations or within other components.

In act 1208, target data is navigated according to aspects and embodiments disclosed herein and in the Multi-Scale Application. The target data may include data that has been previously fingerprinted and for which macro-fingerprints exist in the object database. In some embodiments, the post-process deduplicator queries the object database to determine navigation windows within the reference data and the target data that are likely to include duplicate data, i.e. navigation windows within the reference data and the target data that have sufficiently high match potential. Specific processes executed by the post-process deduplicator to determine and adjust both the navigation windows and their match potential are described in the Multi-Scale Application and U.S. Patent Application Ser. No. 61/800,763, titled "SYSTEMS AND METHODS FOR LOCATING REDUNDANT DATA USING FINGERPRINT PATTERN MATCHING" which was filed on Mar. 15, 2013 and which is hereby incorporated herein by reference in its entirety.

According to one example, the post-process deduplicator queries the object database for macro-fingerprints associated with the reference data. The post-process deduplicator next determines target data based on whether the target data has more than a threshold number of macro-fingerprints that match the macro-fingerprints associated with the reference data. Once one or more target data sets have been identified as potentially having data duplicate to the reference data, the post-process deduplicator may generate one or more object exchange requests to the common object store to load the one or more target object groups into the data cache.

Continuing this example, in response to receiving the one or more object exchange requests, the common object store may locate the requested object(s) and load one or more associated extents housing the object(s) into the data cache. It should be appreciated that the post-process deduplicator may initially request only a portion of the one or more target object groups and make requests to load additional objects (and their associated extents) as may be required due to memory constraints.

In act 1210, the target data is deduplicated. According to a variety of embodiments, the post-process deduplicator may perform a byte-by-byte comparison between the data in a target swath (the target swath being based on one or more adjusted target navigation windows) and the data in a reference swath using a delta differencer. In other embodiments, the post-process deduplicator calculates a hash value for the data in the target swath and the data in the reference swath using a hash function with strong collision resistance, which ensures a high probability that data deemed duplicate is, in fact, duplicate. When a predetermined quantity of duplicate data is found, the post-process deduplicator adjusts boundary locations of data objects comprising the duplicate data (if necessary) and replaces duplicate data object(s) included in target swath with a location identifier to the matching data object(s) in the reference swath. In one embodiment, the location identifier includes an OID and a start and end offset of the referenced data. In act 1216 the duplication process 1200 ends.

Storage Example

Figure 13:
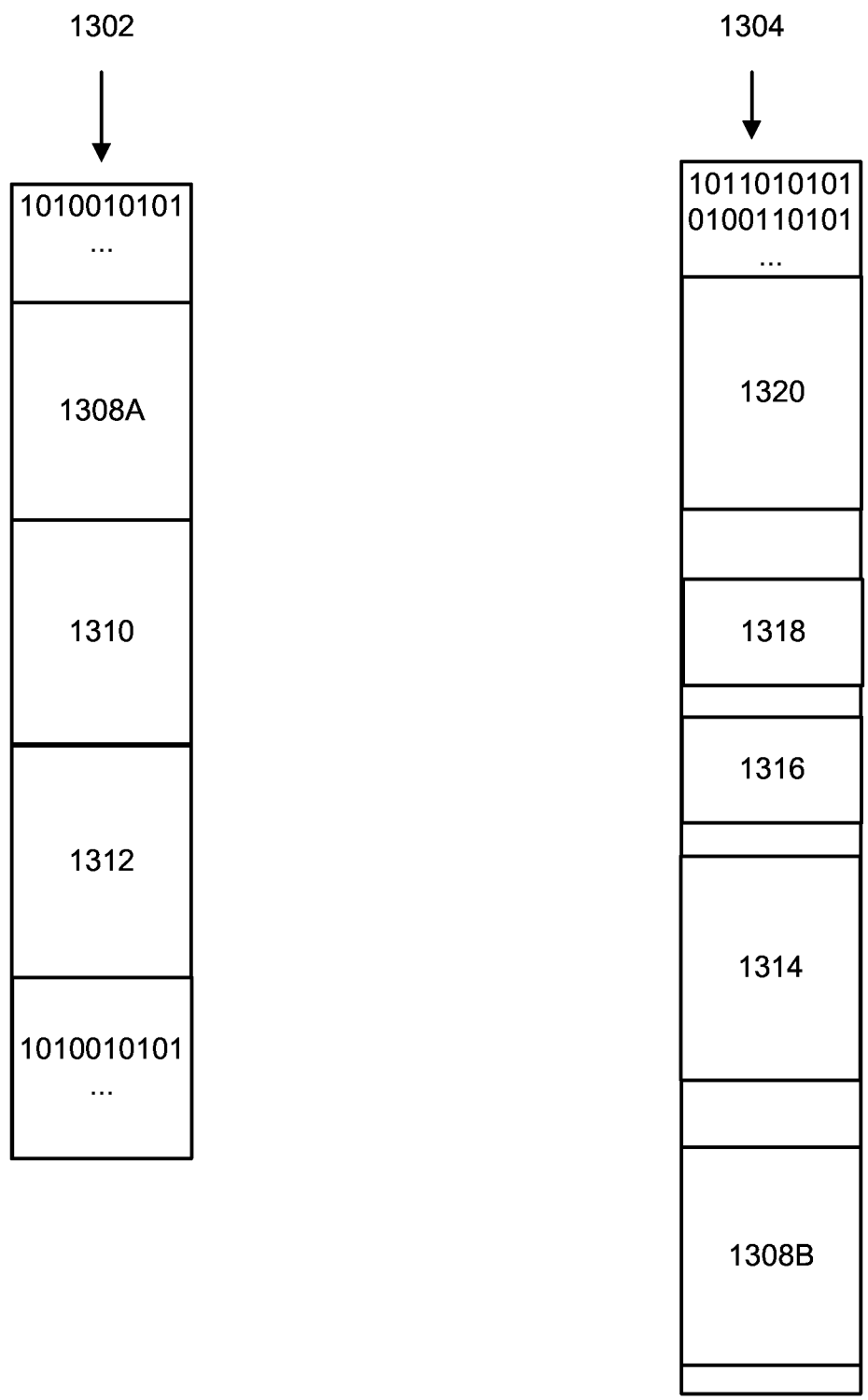
FIG. 13 is a block diagram of data subject to storage and deduplication in accordance with one example.

FIG. 13 illustrates an example of a backup data stream 1302 and a contiguous on-disk representation of data 1304 stored within a common object store. In this example, the backup data stream 1302 is generated by a client computer, such as the client computer 100a of FIG. 1, during a backup process. In other examples, the backup data stream 1302 may be generated by any computerized process, and examples disclosed herein are not limited to data created by any one particular process or circumstance (e.g., full-backup, incremental backup, file backup, file copy operation, etc.).

In this example, the client computer executes a backup process to backup a directory structure that includes directories and files within the directories. This backup process creates the backup data stream 1302. To create the backup data stream 1320, the client computer communicates with a data storage system (e.g., the data storage system 104) using file-system calls (fopen, fwrite, etc), which are transparently handled by a kernel-mode driver on the computer-system. For instance, according to this example, file-write operations are processed by the driver and converted into one or more data exchange requests. Each of the one or more data exchange requests include an identifier of the data to be stored and, in some embodiments, an identifier of the node (e.g., the node 114a) targeted to ingest, i.e., store, the data. Each data exchange request is communicated via a network, such as the network 102, to a data forwarding device, such as the forwarding device 106. In turn, the data forwarding device communicates each data exchange request to the node identified in the data exchange request.

Continuing with this example, a node receives a data exchange request via a file system interface, such as the file system interface 400. Data identified within the data exchange request is written to a data cache, such as the data cache 402, via the file system interface for initial staging and processing. Next, a deduplication director (e.g., the deduplication director 404) that has subscribed to data events receives an indication that the data is available for processing in the data cache.

In this example, the deduplication director determines one or more deduplication templates applicable to the data based on characteristics of the data or contents the data. Next, the deduplication director processes the backup data stream 1302 based on the one or more deduplication templates.

More particularly, in this example, the deduplication director determines that both inline deduplication and post-process deduplication are targeted for the backup data stream 1302. Next, the deduplication director segments the backup data stream 1302 into data objects 1308A, 1310, and 1312. These data objects may be of a fixed size, or a variable size as determined by the applicable deduplication templates.

Continuing this example, the deduplication director schedules the data objects for post-process deduplication and initiates an inline deduplication request with an inline deduplicator (e.g., the inline deduplicator 406) to determine whether the data objects already exist in a common object store (e.g., the common object store 408). The inline deduplication request may include an identifier of one or more of the data objects. In this example, the inline deduplicator receives the inline deduplication request and performs inline deduplication of the one or more objects identified in the inline deduplication request.

More specifically, with reference to FIG. 13, the inline deduplicator determines, by searching to a local chronological structure and a global index for OIDs of the data objects, that the data object 1308A is identical to the data object 1308B within the contiguous on-disk representation of data 1304. The data 1304 may be identified as within one or more extents, as indicated by an object store map, such as the object store map 504. In the example shown, the data 1304 is located in single extent. In other examples, the data may be distributed over several extents and may not be contiguous on disk. Next, the inline deduplicator issues one or more object exchange requests to the common object store to store a reference object for the data object 1308A and unique data objects for the data objects 1310 and 1312.

In response to receiving object exchange requests the common object store compresses the reference object and the unique data objects and packs the compressed objects into one or more extents according to one or more extent packing methodologies. The common object store also updates a chronological tracking structure located within an extent with an OID and location for an object packed into the extent. In this example, the common object store subsequently flushes the extent to persistent storage, such as the data storage device 118.

Continuing this example, a post-process deduplicator, such as the post-process deduplicator 410, is subsequently executed. The post-process deduplicator examines data to determine if additional deduplication may be effected. In this example, the post-process deduplicator uses a tiered hierarchy of fingerprints to navigate to and determine that the data object 1314 includes data that is identical to the data object 1310. In response to identifying these duplicate data objects, the post-process deduplicator issues object exchange requests to replace the data object 1314 with a reference to the data object 1310.

Retrieval Example

According to another example illustrated with reference to FIG. 13, the backup stream 1302 is retrieved from the data storage system 104. In this example, the client system initiates a data exchange request via the network to the forwarding device. In turn, the forwarding device communicates the request to a node identified therein.

The node receives the data exchange request via the file system interface. The file system interface consults a file map to determine one or more OIDs of data objects storing data included in the backup stream 1302. The file system interface next requests the data objects identified by the OIDs (1308A, 1310 and 1312 in this example) from the common object store via one or more object exchange requests.

In response to receiving the object exchange requests, the common object store determines that the data objects 1310 and 1312 are stored in the data cache. Next, the common object store references the object store map to determine that the data object 1308A references the data object 1308B and loads a copy of the extent including 1308B into the data cache by object store map. Next, the common object store returns the data objects 1308A, 1310, and 1312 to the file system interface to satisfy the object exchange request. In return, the file system interface recomposes the backup data stream 1302 based on the returned objects. The recomposed backup data stream 1302 is then returned to the requesting process (e.g., the client computer) to satisfy the data exchange request.

Having thus described several aspects of at least one embodiment, it is appreciated various alterations, modifications, and improvements will readily occur to those skilled in the art. Such alterations, modifications, and improvements are intended to be part of this disclosure, and are intended to be within the scope of the embodiments disclosed herein. Accordingly, the foregoing description and drawings are by way of example only.

What is claimed is:

1. A data storage system comprising:
    memory;
    at least one processor in data communication with the memory; and
    a deduplication director component executable by the at least one processor and configured to:
        receive data for storage on the data storage system;
        analyze the data to determine whether or not the data is suitable for deduplication;
        when it is determined that the data is suitable for deduplication, determine which deduplication process is suitable for the data from at least one of summary-based deduplication and content-based deduplication; and
        store, in a common object store, at least one of the data and a reference to duplicate data stored in the common object store.

2. The data storage system of claim 1, wherein the deduplication director component is configured to store, in the common object store, the data in response to determining that the data is not suitable for deduplication.

3. The data storage system of claim 1, wherein the deduplication director component is configured to store, in the common object store, the reference to the duplicate data at least in part by executing a summary-based deduplication component in response to determining that the data is suitable for summary-based deduplication, the summary-based deduplication component being configured to:
    generate a summary of the data;
    identify the data as being a copy of the duplicate data at least in part by comparing the summary to a duplicate summary of the duplicate data; and
    store, in the common object store, the reference to the duplicate data in response to identifying the data as being a copy of the duplicate data.

4. The data storage system of claim 1, wherein the deduplication director component is configured to store, in the common object store, the reference to the duplicate data at least in part by executing a content-based deduplication component in response to determining that the data is suitable for content-based deduplication, the content-based deduplication component being configured to:
    identify the data as being a copy of the duplicate data by comparing the data to the duplicate data; and
    store, in the common object store, the reference to the duplicate data in response to identifying the data as being a copy of the duplicate data.

5. The data storage system of claim 1, wherein the deduplication director component is configured to analyze the data at least in part to identify at least one deduplication template to apply to the data, the at least one deduplication template specifying one or more deduplication options for the data.

6. The data storage system of claim 5, wherein the at least one deduplication template specifies that at least one of a summary-based deduplication component and a content-based deduplication component processes the data.

7. The data storage system of claim 5, wherein the deduplication director component is configured to analyze characteristics of the data at least in part to identify the at least one deduplication template to apply to the data, the characteristics of the data include at least one of file metadata and a source of the data.

8. The data storage system of claim 1, further comprising a content-based deduplication component and a summary-based deduplication component, wherein the common object store stores a map that associates the data with one or more objects stored in the common object store and at least one of the content-based deduplication component and the summary-based deduplication component is configured to deduplicate the map.

9. The data storage system of claim 8, wherein the content-based deduplication component is configured to deduplicate the map at least in part by re-segmenting at least one data object associated with the map.

10. The data storage system of claim 1, further comprising:
a file system interface component configured to receive one or more files for storage on the data storage system; and
a common object store component executable by the at least one processor and configured to store each of the one or more files as one or more data objects structured differently from the one or more files.

11. The data storage system of claim 10, wherein the file system interface component includes a proxy file system interface configured to receive source level deduplication information.

12. The data storage system of claim 11, wherein the proxy file system interface is further configured to determine whether subject data identified within the source level deduplication information is stored in the data storage system.

13. The data storage system of claim 1, wherein the deduplication director component is further configured to determine whether deduplication should be performed as an inline process or as a post-process.

14. A method of deduplicating data using a data storage system, the method being executed on a hardware device and comprising:
receiving, by the data storage system, data for storage on the data storage system;
analyzing the data to determine whether or not the data is suitable for deduplication;
when it is determined that the data is suitable for deduplication, determine which deduplication process is suitable for the data from at least one of summary-based deduplication and content-based deduplication; and
storing, in a common object store, at least one of the data and a reference to duplicate data stored in the common object store.

15. The method of claim 14, wherein analyzing the data includes identifying at least one deduplication template to apply to the data, the at least one deduplication template specifying one or more deduplication options for the data.

16. The method of claim 15, wherein identifying the at least one deduplication template includes identifying at least one deduplication template that specifies that at least one of a summary-based deduplication component and a content-based deduplication component processes the data.

17. The method of claim 15, wherein analyzing the data further includes analyzing characteristics of the data at least in part to identify the at least one deduplication template to apply to the data, the characteristics of the data include at least one of file metadata and a source of the data.

18. The method of claim 14, wherein the common object store stores a map that associates the data with one or more objects stored in the common object store and the method further comprises deduplicating the map.

19. The method of claim 18, wherein deduplicating the map includes re-segmenting at least one data object associated with the map.

20. The method of claim 14, further comprising:
receiving one or more files for storage on the data storage system; and
storing each of the one or more files as one or more data objects structured differently from the one or more files.

21. The method of claim 20, further comprising receiving source level deduplication information.

22. The method of claim 21, further comprising determining whether subject data identified within the source level deduplication information is stored in the data storage system.

23. The method of claim 14, wherein analyzing the data further includes determining whether deduplication should be performed as an inline process or as a post-process.

24. A non-transitory computer readable storage medium storing computer executable instructions configured to instruct at least one processor to execute a hybrid deduplication process, the computer executable instructions including instructions to:
receive data for storage on the data storage system;
analyze the data to determine whether or not the data is suitable deduplication;
when it is determined that the data is suitable for deduplication, determine which deduplication process is suitable for the data from at least one of summary-based deduplication and content-based deduplication; and
store, in a common object store, at least one of the data and a reference to duplicate data stored in the common object store.

25. The non-transitory storage medium of claim 24, wherein the computer executable instructions further include instructions to determine whether deduplication should be performed as an inline process or as a post-process.

26. The non-transitory storage medium of claim 24, wherein the computer executable instructions further include instructions to analyze characteristics of the data at least in part to identify at least one deduplication template to apply to the data, the characteristics of the data include at least one of file metadata and a source of the data, the at least one deduplication template specifying that at least one of a summary-based deduplication component and a content-based deduplication component processes the data.

* * * * *